(12) United States Patent
Kikuchi

(10) Patent No.: US 8,468,140 B2
(45) Date of Patent: Jun. 18, 2013

(54) INFORMATION PROCESSING APPARATUS READING OUT AND DISPLAYING CONTENTS, AND METHOD FOR THE SAME

(75) Inventor: Toru Kikuchi, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 435 days.

(21) Appl. No.: 12/027,207

(22) Filed: Feb. 6, 2008

(65) Prior Publication Data

US 2008/0294593 A1 Nov. 27, 2008

(30) Foreign Application Priority Data

Feb. 9, 2007 (JP) ................................. 2007-031279

(51) Int. Cl.
*G06F 7/00* (2006.01)

(52) U.S. Cl.
USPC ........................... 707/705; 715/744; 715/747

(58) Field of Classification Search
USPC .................. 707/1, 3, 705; 348/75, 87; 705/1, 705/10; 715/838, 744, 747
See application file for complete search history.

(56) References Cited

U.S. PATENT DOCUMENTS

| | | | |
|---|---|---|---|
| 6,463,432 B1* | 10/2002 | Murakawa | 1/1 |
| 7,346,894 B1* | 3/2008 | Cook | 717/121 |
| 7,617,461 B2* | 11/2009 | Yoshida | 715/777 |
| 7,930,434 B2* | 4/2011 | Aguera y Arcas et al. | 709/247 |
| 8,028,243 B1* | 9/2011 | O'Riordan | 715/765 |
| 2002/0169658 A1* | 11/2002 | Adler | 705/10 |
| 2003/0145277 A1* | 7/2003 | Neal et al. | 715/509 |
| 2004/0080541 A1* | 4/2004 | Saiga et al. | 345/805 |
| 2004/0090470 A1* | 5/2004 | Kim et al. | 345/846 |
| 2004/0215660 A1* | 10/2004 | Ikeda | 707/104.1 |
| 2004/0243940 A1* | 12/2004 | Lee et al. | 715/744 |
| 2005/0160375 A1* | 7/2005 | Sciammarella et al. | 715/838 |
| 2005/0172035 A1* | 8/2005 | Morris | 710/1 |
| 2007/0195165 A1* | 8/2007 | Hirakawa | 348/75 |
| 2007/0226638 A1* | 9/2007 | Kramer et al. | 715/764 |
| 2008/0055218 A1* | 3/2008 | Tsuda et al. | 345/87 |
| 2010/0235756 A1* | 9/2010 | Yoshihama | 715/745 |

FOREIGN PATENT DOCUMENTS

| | | |
|---|---|---|
| JP | 08-235216 A | 9/1996 |
| JP | 8-235216 A | 9/1996 |
| JP | 11-252234 A | 9/1999 |
| JP | 2004-030369 A | 1/2004 |
| JP | 2004-255740 A | 9/2004 |
| WO | 2006-100715 A1 | 9/2006 |

\* cited by examiner

*Primary Examiner* — Pierre Vital
*Assistant Examiner* — Christopher J Raab
(74) *Attorney, Agent, or Firm* — Canon U.S.A., Inc., IP Division

(57) ABSTRACT

The present invention maintains the response speed to users operations when operation-target contents are changed and improves the operability in data retrieval operations. An information processing apparatus for reading out content information from a storage unit accumulating the content information and for displaying the content information holds association information that associates each of extraction conditions used for reading out the content information from the storage unit with a corresponding one of memory areas. The apparatus reads out content information from the storage unit according to the extraction conditions and stores the content information in the corresponding memory areas. The apparatus specifies a memory area corresponding to an extraction condition specified by a user based on the association information, reads out the content information from the specified memory area, and displays an image based on the read out content information on a display.

6 Claims, 25 Drawing Sheets

FIG. 3

| CONTENT ID | FILE NAME | CREATION DATE/TIME | CREATOR | ALBUM ID | CONTENT TYPE | DISPLAY IMAGE |
|---|---|---|---|---|---|---|
| 1 | IMAGE_01.JPG | 12/10/2002 11:43 | MIKE | 1 | PHOTOGRAPH | IMAGE_01.THM |
| 2 | IMAGE_02.JPG | 12/23/2002 8:25 | MARY | 2 | PHOTOGRAPH | IMAGE_02.THM |
| 3 | IMAGE_03.JPG | 3/18/2005 13:18 | MIKE | 3 | PHOTOGRAPH | IMAGE_03.THM |
| 4 | MOVIE_04.AVI | 3/18/2005 14:36 | MIKE | 1 | PRIVATE VIDEO | MOVIE_04.THM |
| 5 | MUSIC_05.MP3 | 4/1/2005 7:31 | TOM | 4 | MUSIC | MUSIC_05.THM |
| 6 | MOVIE_06.MPG | 5/20/2005 15:21 | MARY | 4 | MOVIE | MOVIE_06.THM |
| 7 | MOVIE_07.MPG | 6/30/2005 9:58 | TOM | 3 | RECORDED TV PROGRAM | MOVIE_07.THM |
| ... | | | | | | |

| ALBUM ID | ALBUM NAME | CREATION DATE/TIME | CREATOR | DISPLAY IMAGE |
|---|---|---|---|---|
| 1 | SEA | 12/10/2002 11:43 | MIKE | IMAGE_01.THM |
| 2 | OVERSEAS TRIP | 12/23/2002 8:25 | MARY | IMAGE_02.THM |
| 3 | KYOTO | 3/18/2005 13:18 | MIKE | IMAGE_03.THM |
| 4 | FAVORITE | 4/1/2005 7:31 | TOM | MUSIC_05.THM |

| TEMPORARY STORAGE UNIT ID | SORTING CONDITION |
|---|---|
| 1 | NAME (ASCENDING ORDER) |
| 2 | NAME (DESCENDING ORDER) |
| 3 | CREATION DATE/TIME (ASCENDING ORDER) |
| 4 | CREATION DATE/TIME (DESCENDING ORDER) |
| 5 | CREATOR (ASCENDING ORDER) |
| 6 | CREATOR (DESCENDING ORDER) |

FIG. 11

| TEMPORARY STORAGE UNIT ID | REFINING CONDITION | SORTING CONDITION |
|---|---|---|
| 1 | PHOTOGRAPH | NAME (ASCENDING ORDER) |
| 2 | PRIVATE VIDEO | NAME (ASCENDING ORDER) |
| 3 | MUSIC | NAME (ASCENDING ORDER) |
| 4 | MOVIE | NAME (ASCENDING ORDER) |
| 5 | RECORDED TV PROGRAM | NAME (ASCENDING ORDER) |
| 6 | PHOTOGRAPH | NAME (DESCENDING ORDER) |
| 7 | PHOTOGRAPH | CREATION DATE/TIME (ASCENDING ORDER) |
| 8 | PHOTOGRAPH | CREATION DATE/TIME (DESCENDING ORDER) |
| 9 | PHOTOGRAPH | CREATOR (ASCENDING ORDER) |
| 10 | PHOTOGRAPH | CREATOR (DESCENDING ORDER) |

FIG. 15

| TEMPORARY STORAGE UNIT ID | SORTING CONDITION | GROUPING CONDITION |
|---|---|---|
| 1 | NAME (ASCENDING ORDER) | EACH CONTENT |
| 2 | NAME (ASCENDING ORDER) | EACH ALBUM |
| 3 | CREATION DATE/TIME (ASCENDING ORDER) | EACH CONTENT |
| 4 | CREATION DATE/TIME (ASCENDING ORDER) | EACH DAY |
| 5 | CREATION DATE/TIME (ASCENDING ORDER) | EACH MONTH |
| 6 | CREATION DATE/TIME (ASCENDING ORDER) | EACH YEAR |

| PHOTOGRAPH ID | CONTENT ID | CAMERA TYPE | CAPTURING MODE | RESOLUTION |
|---|---|---|---|---|
| 1 | 1 | CAMERA 01 | LANDSCAPE | 3072 × 2048 |
| 2 | 2 | CAMERA 02 | PORTRAIT | 2048 × 1536 |
| 3 | 3 | CAMERA 03 | MACRO | 3072 × 2048 |
| ⋮ | | | | |

| PRIVATE VIDEO ID | CONTENT ID | CAMERA TYPE | CAPTURING MODE |
|---|---|---|---|
| 1 | 4 | CAMCORDER 01 | SUNSET |
| ⋮ | | | |

| MUSIC ID | CONTENT ID | SONG TITLE | ARTIST | GENRE | DURATION |
|---|---|---|---|---|---|
| 1 | 5 | FLOWER | MARY | POPS | 3m45s |

| MOVIE ID | CONTENT ID | TITLE | DIRECTOR | LEADING PERFORMER | DURATION |
|---|---|---|---|---|---|
| 1 | 6 | HELLO | DAVID | JACK | 3h18m28s |

| RECORDED TV PROGRAM ID | CONTENT ID | PROGRAM TITLE | CATEGORY | BROADCASTING STATION | MAIN CAST | SUB CAST |
|---|---|---|---|---|---|---|
| 3 | 7 | ALL ABOUT KYOTO | TRAVEL | TRAVEL BROADCASTING | EDDIE | EMMA, NICK |

| TEMPORARY STORAGE UNIT ID | SORTING CONDITION |
|---|---|
| 1 | NAME (ASCENDING ORDER) |
| 2 | CREATION DATE/TIME (ASCENDING ORDER) |
| 3 | CREATOR (ASCENDING ORDER) |

FIG. 24B

| TEMPORARY STORAGE UNIT ID | SORTING CONDITION |
|---|---|
| 1 | NAME (ASCENDING ORDER) |
| 2 | CREATION DATE/TIME (ASCENDING ORDER) |
| 3 | CREATOR (ASCENDING ORDER) |
| 4 | CAMERA TYPE (ASCENDING ORDER) |
| 5 | CAPTURING MODE (ASCENDING ORDER) |
| 6 | RESOLUTION (ASCENDING ORDER) |

FIG. 24C

| TEMPORARY STORAGE UNIT ID | SORTING CONDITION |
|---|---|
| 1 | CREATION DATE/TIME (ASCENDING ORDER) |
| 2 | SONG TITLE (ASCENDING ORDER) |
| 3 | ARTIST (ASCENDING ORDER) |
| 4 | GENRE (ASCENDING ORDER) |
| 5 | DURATION (ASCENDING ORDER) |

FIG. 24D

| TEMPORARY STORAGE UNIT ID | SORTING CONDITION |
|---|---|
| 1 | CREATION DATE/TIME (ASCENDING ORDER) |
| 2 | CREATOR (ASCENDING ORDER) |
| 3 | CAMERA TYPE (ASCENDING ORDER) |
| 4 | CAPTURING MODE (ASCENDING ORDER) |

| TEMPORARY STORAGE UNIT ID | SORTING CONDITION |
|---|---|
| 1 | CREATION DATE/TIME (ASCENDING ORDER) |
| 2 | TITLE (ASCENDING ORDER) |
| 3 | DIRECTOR (ASCENDING ORDER) |
| 4 | LEADING PERFORMER (ASCENDING ORDER) |
| 5 | DURATION (ASCENDING ORDER) |

| TEMPORARY STORAGE UNIT ID | SORTING CONDITION |
|---|---|
| 1 | CREATION DATE/TIME (ASCENDING ORDER) |
| 2 | PROGRAM TITLE (ASCENDING ORDER) |
| 3 | CATEGORY (ASCENDING ORDER) |
| 4 | BROADCASTING STATION (ASCENDING ORDER) |
| 5 | MAIN CAST (ASCENDING ORDER) |

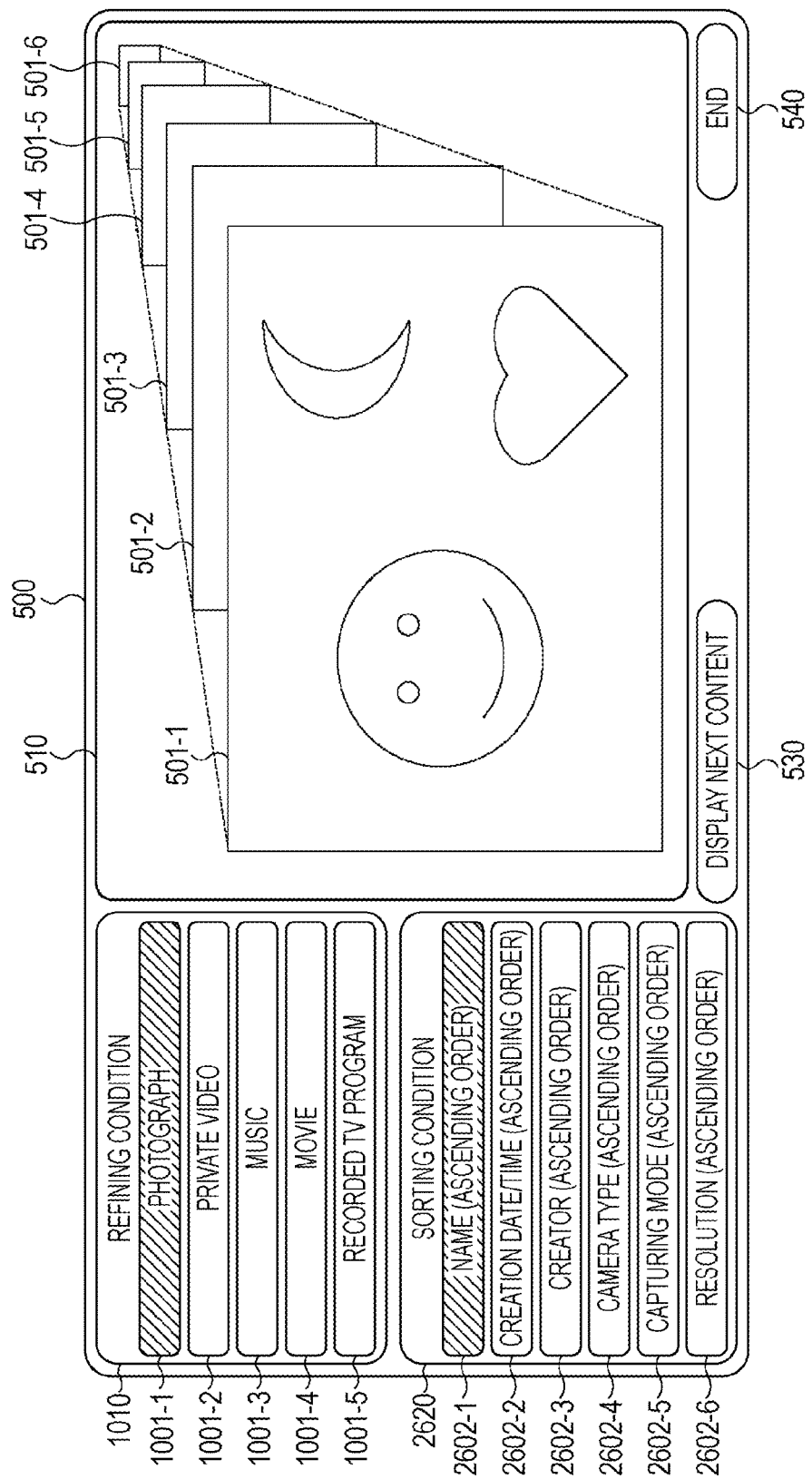

| REFINING CONDITION | SORTING CONDITION |
|---|---|
| NOT SPECIFIED | NAME (ASCENDING ORDER) |
| | CREATION DATE/TIME (ASCENDING ORDER) |
| | NAME (ASCENDING ORDER) |
| PHOTOGRAPH | NAME (ASCENDING ORDER) |
| | CREATION DATE/TIME (ASCENDING ORDER) |
| | CREATOR (ASCENDING ORDER) |
| | CAMERA TYPE (ASCENDING ORDER) |
| | CAPTURING MODE (ASCENDING ORDER) |
| | RESOLUTION (ASCENDING ORDER) |
| MUSIC | CREATION DATE/TIME (ASCENDING ORDER) |
| | SONG TITLE (ASCENDING ORDER) |
| | ARTIST (ASCENDING ORDER) |
| | GENRE (ASCENDING ORDER) |
| | DURATION (ASCENDING ORDER) |

| REFINING CONDITION | SORTING CONDITION |
|---|---|
| PRIVATE VIDEO | CREATION DATE/TIME (ASCENDING ORDER) |
| | CREATOR (ASCENDING ORDER) |
| | CAMERA TYPE (ASCENDING ORDER) |
| | CAPTURING MODE (ASCENDING ORDER) |
| MOVIE | CREATION DATE/TIME (ASCENDING ORDER) |
| | TITLE (ASCENDING ORDER) |
| | DIRECTOR (ASCENDING ORDER) |
| | LEADING PERFORMER (ASCENDING ORDER) |
| | DURATION (ASCENDING ORDER) |
| RECORDED TV PROGRAM | CREATION DATE/TIME (ASCENDING ORDER) |
| | PROGRAM TITLE (ASCENDING ORDER) |
| | CATEGORY (ASCENDING ORDER) |
| | BROADCASTING STATION (ASCENDING ORDER) |
| | MAIN CAST (ASCENDING ORDER) |

INFORMATION PROCESSING APPARATUS READING OUT AND DISPLAYING CONTENTS, AND METHOD FOR THE SAME

BACKGROUND OF THE INVENTION

1. Field of the Invention

The present invention relates to information processing apparatuses that accumulate data such as image data, video data, audio data, and document data and that read out and display the data, and to methods for the same.

2. Description of the Related Art

Recently, the use of digital appliances, such as digital cameras, digital camcorders, digital audio players, digital video disk recorders, and flat-screen televisions, has been rapidly increasing. These digital appliances generate, accumulate, and reproduce (display) data such as image data, video data, audio data, and document data (hereinafter, collectively referred to as "contents"). Such contents are diverse, and an amount of the contents owned by an individual continues to increase.

To allow users to find a target content, information processing apparatuses generally display a list of contents. When there are many contents, the information processing apparatuses arrange the contents into a hierarchy to collectively handle a plurality of contents as a group using folders each having a name, thereby improving the findability. When a target content is not found using the folders, the information processing apparatuses find the target content by retrieving.

The above-described functions for arranging contents using folders and for retrieving the contents are suitable for content access performed in personal computers, namely, operations performed with a mouse and a keyboard. However, such functions are not necessarily suitable for operations performed with a television (hereinafter, abbreviated as a TV) and an infrared remote control (hereinafter, abbreviated as a remote control).

Accordingly, a function for sequentially displaying contents on a screen on the basis of a specified condition about a sorting order of a selected group of contents, such as, for example, all of the contents, only image contents, only video contents, or only audio contents, is known as a function suitable for content access performed with a remote control. For example, when users desire to see or listen to recently stored content, the users have only to press a button to sort all of the contents in a descending order of date and then sequentially view the contents using a "NEXT" button. In addition, when users desire to see a photograph captured in the last December, users switch a display mode to display the contents in a unit of month using an "EACH MONTH" button (in response to which, for example, a content representing that month is displayed) and select a target month. The users then press another button to sort the contents in a descending order of date and sequentially view the contents.

However, these functions require a sorting operation every time the sorting condition or the target group of contents is switched, which undesirably lowers the switching speed and decreases the usability. For example, the following two techniques for shortening a sorting time are known.

According to one technique, when song data is added to a library or when a memory card storing the song data is inserted to an information processing apparatus, the information processing apparatus sorts the song data in an order of the song title or the artist name and stores the sorting result. In response to an operation for displaying the song data in an order of the song title or the artist name, the information processing apparatus reads out the song data from the corresponding memory and displays the song data (Japanese Patent Laid-Open No. 8-235216).

According to another technique, an information processing apparatus sorts files recorded therein in response to addition or deletion of a file and stores the sorting result in a specific storage unit corresponding to each of sorting methods. In response to selection of a sorting method, the information processing apparatus reads out a file on the basis of the sorting result stored in the corresponding storage unit and displays the file (Japanese Patent Laid-Open No. 2004-30369).

However, since the above-described techniques used in the related art assume that a sorting-target group of contents is fixed, the above-described techniques are undesirably incapable of handling various requests entered through a user interface at the time of a content retrieval operation. The above-described techniques used in the related art do not consider a change of a sorting-target group of contents. Thus, the response speed to users operations and the operability undesirably decrease.

SUMMARY OF THE INVENTION

In view of the above-described disadvantages, an embodiment of the present invention allows the response speed to user operations to be maintained when an operation-target group of contents is changed. The embodiment improves the operability in data retrieval operations.

An information processing apparatus according to an aspect of the present invention has the following elements. More specifically, an information processing apparatus for reading out a content from a storage unit that accumulates contents and displaying the read out content includes a first information holding unit configured to hold association information that associates each of a plurality of extraction conditions used for reading out the content information from the storage unit with a corresponding one of a plurality of memory areas, a second information holding unit configured to read out a plurality of pieces of content information from the storage unit according to the plurality of extraction conditions, and to store the plurality of pieces of content information in the corresponding ones of the plurality of memory areas, and a display control unit configured to specify a memory area corresponding to an extraction condition specified by a user on the basis of the association information, to read out the content information from the specified memory area, and to display an image based on the read out content information on a display.

A method for controlling an information processing apparatus is an information processing method for an information processing apparatus for reading out a content from a storage unit that accumulates contents and displaying the read out content. The information processing method includes holding association information that associates each of a plurality of extraction conditions used for reading out the content information from the storage unit with a corresponding one of a plurality of memory areas, reading out a plurality of pieces of content information from the storage unit according to the plurality of extraction conditions, and storing the plurality of pieces of content information in the corresponding ones of the plurality of memory areas, and specifying a memory area corresponding to an extraction condition specified by a user on the basis of the association information, reading out the content information from the specified memory area, and displaying an image based on the read out content information on a display.

The embodiments of the present invention allow the response speed to a user operation to be maintained when an operation-target group of contents is changed and improve the operability in data retrieval operations.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate exemplary embodiments of the present invention and, together with the description, serve to explain the principles of the invention.

FIG. 3 is a diagram showing an example of content information according to exemplary embodiments 1 to 4 of the present invention.

FIG. 4 is a diagram showing an example of album information according to exemplary embodiments 1 to 4 of the present invention.

FIG. 6 is a diagram showing an example of database access condition association information according to an exemplary embodiment 1 of the present invention.

FIG. 11 is a diagram showing an example of database access condition association information according to an exemplary embodiment 2 of the present invention.

FIG. 15 is a diagram showing an example of database access condition association information according to an exemplary embodiment 3 of the present invention.

FIG. 19 is a diagram showing an example of photograph content information according to an exemplary embodiment 4 of the present invention.

FIG. 20 is a diagram showing an example of private video content information according to an exemplary embodiment 4 of the present invention.

FIG. 21 is a diagram showing an example of music content information according to an exemplary embodiment 4 of the present invention.

FIG. 22 is a diagram showing an example of movie content information according to an exemplary embodiment 4 of the present invention.

FIG. 23 is a diagram showing an example of recorded TV program content information according to an exemplary embodiment 4 of the present invention.

FIGS. 24A to 24F are diagrams showing examples of database access condition association information according to an exemplary embodiment 4 of the present invention.

FIG. 26 is a diagram showing an example of a user interface screen according to an exemplary embodiment 4 of the present invention.

FIGS. 27A and 27B are diagrams showing examples of access condition deciding information according to an exemplary embodiment 4 of the present invention.

DESCRIPTION OF THE EMBODIMENTS

Figure 1:
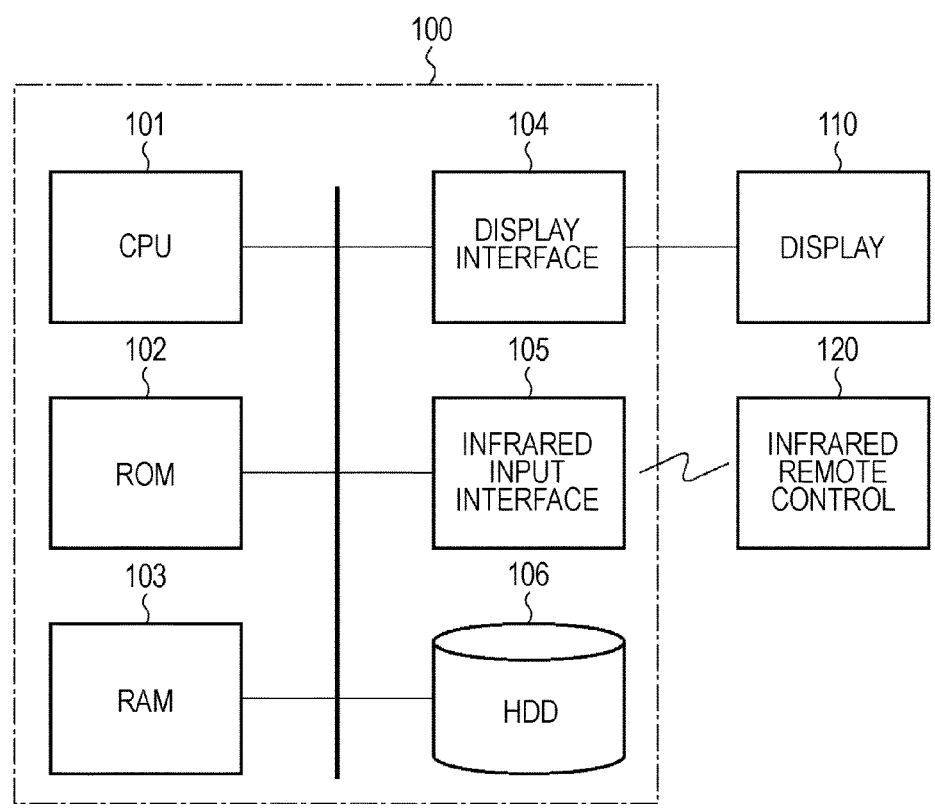
FIG. 1 is a diagram showing a hardware configuration of a data access apparatus according to exemplary embodiments 1 to 4 of the present invention.

Exemplary embodiments of the present invention will be described in detail below with reference to the accompanying drawings. The exemplary embodiments are illustrative only. It should be noted that the exemplary embodiments do not limit the scope of the present invention.

In the description of all of exemplary embodiments given below, it is assumed that elements denoted by the same or like reference numerals in a plurality of drawings have common or similar configurations unless otherwise noted.

Exemplary Embodiment 1

FIG. 1 is a block diagram showing an example of a hardware configuration of a data access apparatus serving as an information processing apparatus according to an exemplary embodiment 1 of the present invention. As shown in FIG. 1, a data access apparatus 100 has a central processing unit (CPU) 101, a read-only memory (ROM) 102, a random access memory (RAM) 103, a hard disk drive (HDD) 106, a display interface 104, and an infrared input interface 105.

The infrared input interface 105 receives infrared signals from an infrared remote control 120 and converts the received infrared signals into electric signals. An infrared interface device driver (not shown) converts the electric signals into information processable by the CPU 101. The display interface 104 converts screen information supplied from a display device driver (not shown) into signals displayable by a display 110. An operating system (hereinafter, abbreviated as OS), each processing program according to the exemplary embodiment, and device drivers are stored in the HDD 106, loaded to the RAM 103, and executed by the CPU 101. The ROM 102 stores a basic input output system (BIOS). At the time of power on, the CPU 101 executes the BIOS, thereby realizing a minimum booting process for activating the OS stored in the HDD 106.

Figure 2:
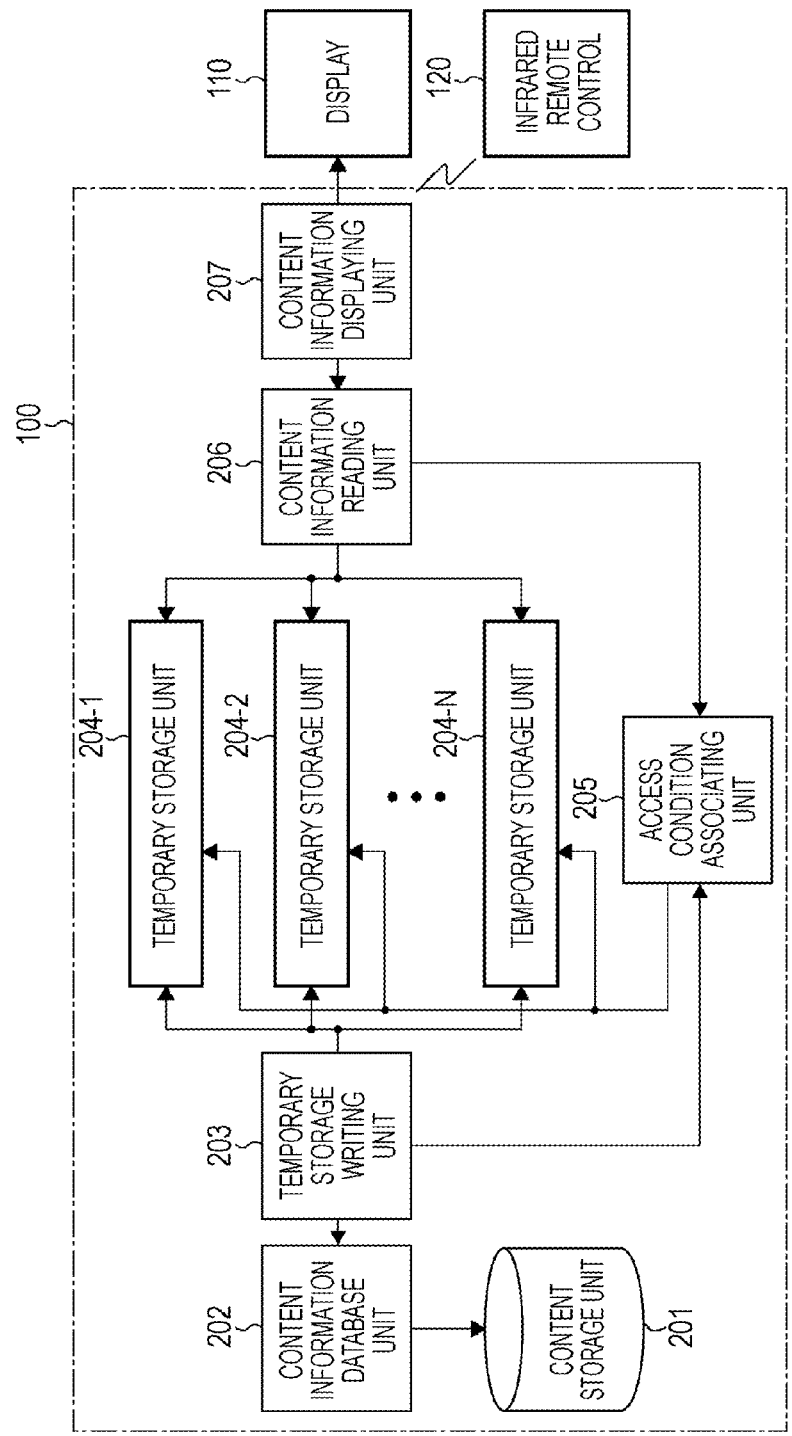
FIG. 2 is a diagram showing a functional configuration of a data access apparatus according to exemplary embodiments 1 to 3 of the present invention.

FIG. 2 is a block diagram showing a functional configuration of the data access apparatus according to the exemplary embodiment 1. As shown in FIG. 2, the data access apparatus 100 according to the exemplary embodiment 1 has a content storage unit 201, a content information database unit 202, a temporary storage writing unit 203, temporary storage units 204-1 to 204-N, an access condition associating unit 205, a content information reading unit 206, and a content information displaying unit 207. The content information database unit 202, the temporary storage writing unit 203, the access condition associating unit 205, the content information reading unit 206, and the content information displaying unit 207 correspond to a display control function realized by the CPU 101 executing a predetermined control program.

The content storage unit 201 includes, for example, a hard disk drive and stores entities of the contents. The content information database unit 202 is a database that manages contents using content information 300, and functions as a storage unit that accumulates the content information. The content storage unit 201 stores entities of files that are specified by an item "FILE NAME" of the content information 300, which will described later with reference to FIG. 3, and entities of files (images used in a list, such as thumbnail image data) specified by an item "DISPLAY IMAGE" of the content information 300. The content information 300 includes metadata of content, such as creator information, an album ID, and a content type.

The temporary storage units 204-1 to 204-N temporarily store the content information 300 read out from the content information database unit 202. Although first-in-first-out (FIFO) buffers are employed as the temporary storage units 204-1 to 204-N in this exemplary embodiment, the temporary storage units 204-1 to 204-N are not limited to this particular example. In addition, the temporary storage units 204-1 to 204-N include a semiconductor memory in this exemplary embodiment. However, while each of the temporary storage units 204-1 to 204-N has an independent storage area, they can be formed of a single memory or multiple memories which may be dependent or independent from one another.

The access condition associating unit 205 generates database access condition association information (hereinafter, referred to as association information) 600, which will be described later with reference to FIG. 6. In the association information 600, information associating the temporary storage units 204-1 to 204-N and database access conditions is registered.

The temporary storage writing unit 203 reads out content information from the content information database unit 202 according to the database access condition registered in the association information 600 generated by the access condition associating unit 205. The temporary storage writing unit 203 then writes the read out content information in one of the temporary storage units 204-1 to 204-N that corresponds to the database access condition with reference to the association information 600. For example, in the case of the association information 600 shown in FIG. 6, the temporary storage writing unit 203 sequentially acquires content information from the content information database unit 202 using a sorting condition "NAME (ASCENDING ORDER)" as the database access condition. The temporary storage writing unit 203 then stores the content information in a temporary storage unit having an ID of 1. Similarly, the temporary storage writing unit 203 sequentially acquires content information using a sorting condition "NAME (DESCENDING ORDER)" as the database access condition and stores the content information in a temporary storage unit having an ID of 2. In the same (or alternatively similar) manner, content information acquired according to each sorting condition is stored in temporary storage units having IDs of 3 to 6.

The content information displaying unit 207 displays a user interface screen 500, which will be described later with reference to FIG. 5, on the display 110. Through this user interface screen 500, users can specify a desired database access condition. The content information displaying unit 207 also accepts an instruction entered on the user interface screen 500 and transfers the instruction to the content information reading unit 206, for example. The content information reading unit 206 specifies a temporary storage unit corresponding to the specified database access condition with reference to the association information 600 held in the access condition associating unit 205. The content information reading unit 206 then reads out content information from the temporary storage unit specified from the temporary storage units 204-1 to 204-N. The content information displaying unit 207 displays the content information, read out by the content information reading unit 206, on the display 110. The content information displaying unit 207 displays the read out content information on the user interface screen 500. In this exemplary embodiment, images registered at a column of "DISPLAY IMAGE" of the content information 300 (FIG. 3) are displayed as shown by display screens 501-1 to 501-6 in FIG. 5.

FIG. 3 is a diagram showing an example of a data structure of content information held by the content information database unit 202 according to the exemplary embodiment 1. The content information 300 shown in FIG. 3 includes, but not limited to, a content ID, a file name, date and time of creation, a creator name, an album ID, a content type, and a file name of a display image. These data items included in the content information 300 are associated with each content as metadata thereof.

FIG. 4 shows an example of album information according to the exemplary embodiment 1. As shown in FIG. 4, album information 400 includes, but not limited to, an album ID, a name of the album, date and time of creation, a creator name, and a file name of a display image. The album information is used for grouping of contents employed in an exemplary embodiment 3 described later. For example, FIG. 3 shows that contents having content IDs of 1 and 4 are grouped by an album name of "SEA" corresponding to the album ID of 1. However, since the album information is not employed in the exemplary embodiment 1, the album information and an item of the album ID shown in FIG. 3 may be omitted.

Figure 5:
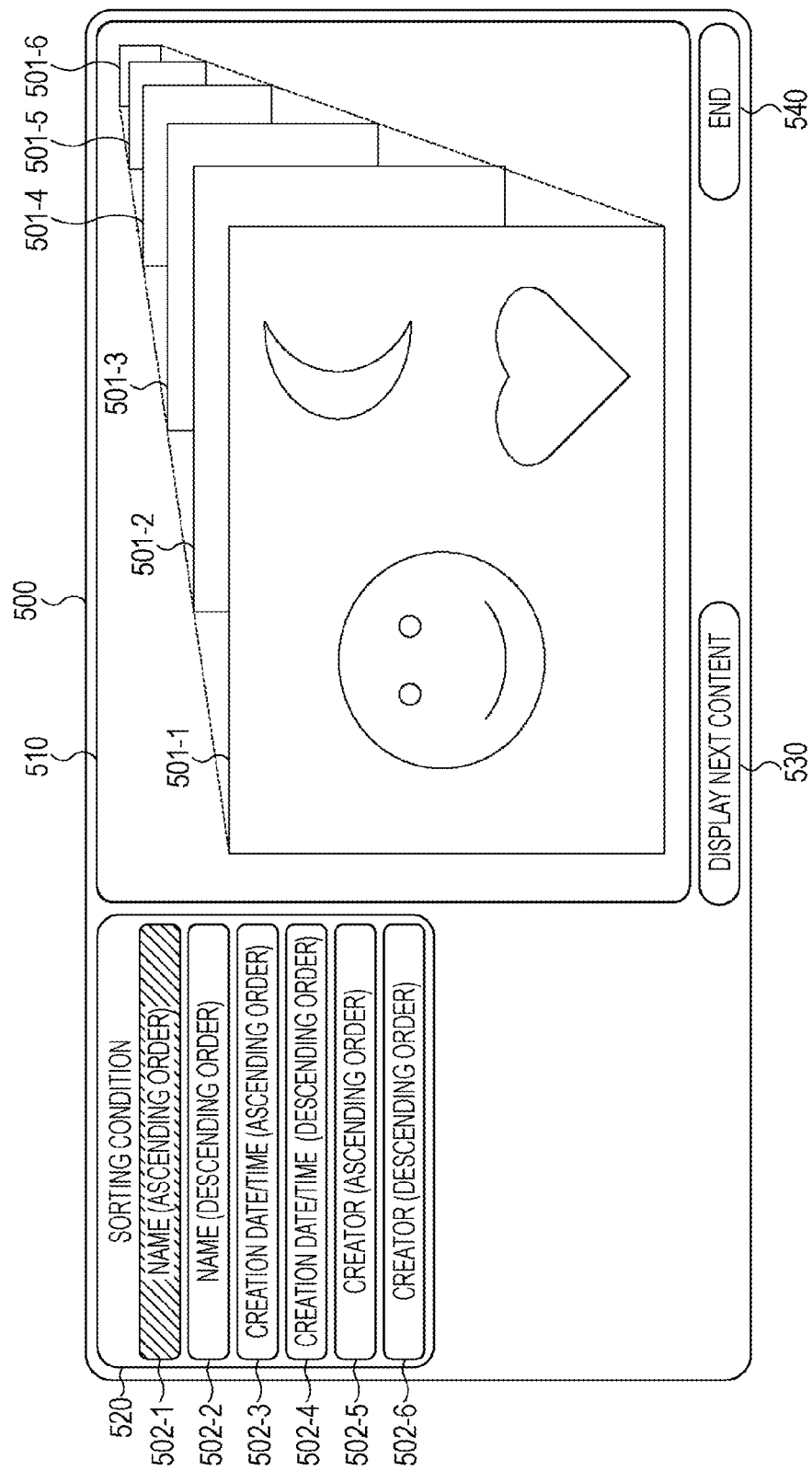
FIG. 5 is a diagram showing an example of a user interface screen according to an exemplary embodiment 1 of the present invention.

FIG. 5 is a diagram showing an example of a user interface screen according to the exemplary embodiment 1. As shown in FIG. 5, a user interface screen 500 includes a content information display area 510, a sorting condition selection button display area 520, a next content display button 530, and an end button 540. The content information display area 510 includes content information display screens 501-1 to 501-6. The content information display screens 501-1 to 501-6 display images registered at the column of "DISPLAY IMAGE" of the content information 300. In the user interface screen 500, an image regarding a content read out first is displayed at a position of the screen 501-6 and the display position is sequentially shifted to the position of the screen 501-1.

The sorting condition selection button display area 520 includes sorting condition selection buttons 502-1 to 502-6. In response to selection of one of the sorting condition selection buttons 502-1 to 502-6, the sorting condition is updated. In response to the update of the sorting condition, the content information reading unit 206 specifies a temporary storage unit corresponding to the selected sorting condition selection button from the temporary storage units 204-1 to 204-N with reference to the association information 600 held in the access condition associating unit 205. The content information reading unit 206 then sequentially reads out content information from the specified temporary storage unit and updates the content information display screens 501-1 to 501-6.

In response to selection of the next content display button 530, the content information display screens 501-2 to 501-6 sequentially move forward, and the content information reading unit 206 reads out the next content information from the specified temporary storage unit. An image specified by the item of "DISPLAY IMAGE" of the read out content information is displayed as the content information display screen 501-6. In response to selection of the end button 540, the process is terminated.

FIG. 6 is a diagram showing an example of the association information 600 according to the exemplary embodiment 1. As shown in FIG. 6, the association information 600 associates a database access condition and an ID of a temporary storage unit. The database access condition is an extraction condition used for extracting content information from the content information database unit 202. In the example shown in FIG. 6, the sorting condition is employed as the database access condition. The ID of the temporary storage unit is information uniquely identifying each of the temporary storage units 204-1 to 204-N. The association information 600 shown in FIG. 6 is only an example, and the association information is not limited to this particular example.

Figure 7:
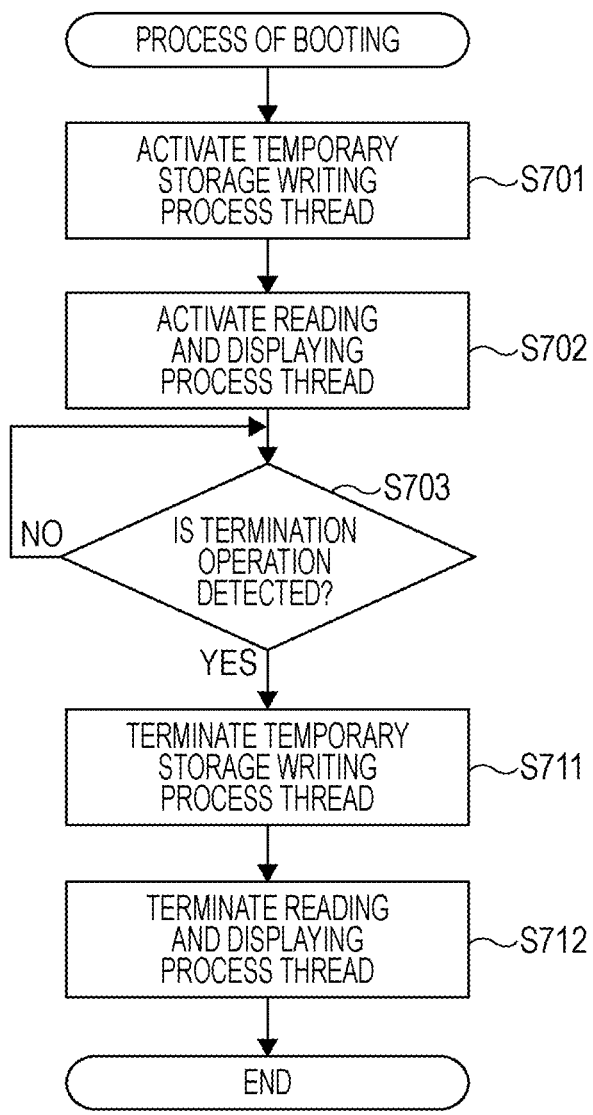
FIG. 7 is a flowchart showing a booting process performed in a data access apparatus according to exemplary embodiments 1 to 4 of the present invention.

FIG. 7 is a flowchart showing a booting process performed by the data access apparatus 100 according to the exemplary embodiment 1. The process shown in FIG. 7 is realized by the CPU 101 executing a predetermined control program loaded to the RAM 103 from the HDD 106.

After the start of the booting process, the data access apparatus 100 activates a thread for a temporary storage writing process (hereinafter, referred as a temporary storage writing process thread) (at STEP S701), which will be described with reference to FIG. 8. The data access apparatus 100 then activates a thread for a reading and displaying process (hereinafter, referred to as a reading and displaying process thread) (at STEP S702), which will be described with reference to FIG. 9. The data access apparatus 100 monitors existence or absence of a termination operation (at STEP S703). Upon detecting the termination operation, the data access apparatus 100 issues a termination command to the temporary storage writing process thread activated at STEP S701 (at STEP S711) to terminate the temporary storage writing process. The data access apparatus 100 then issues a termination command to the reading and displaying process thread activated at STEP S702 (at STEP S712) to terminate the reading and displaying process. The data access apparatus 100 then terminates this booting process. The data access apparatus 100 repeats STEP S703 until the termination operation is detected. The termination operation detected at STEP S703 is performed by selecting the end button 540 shown in FIG. 5.

Figure 8:
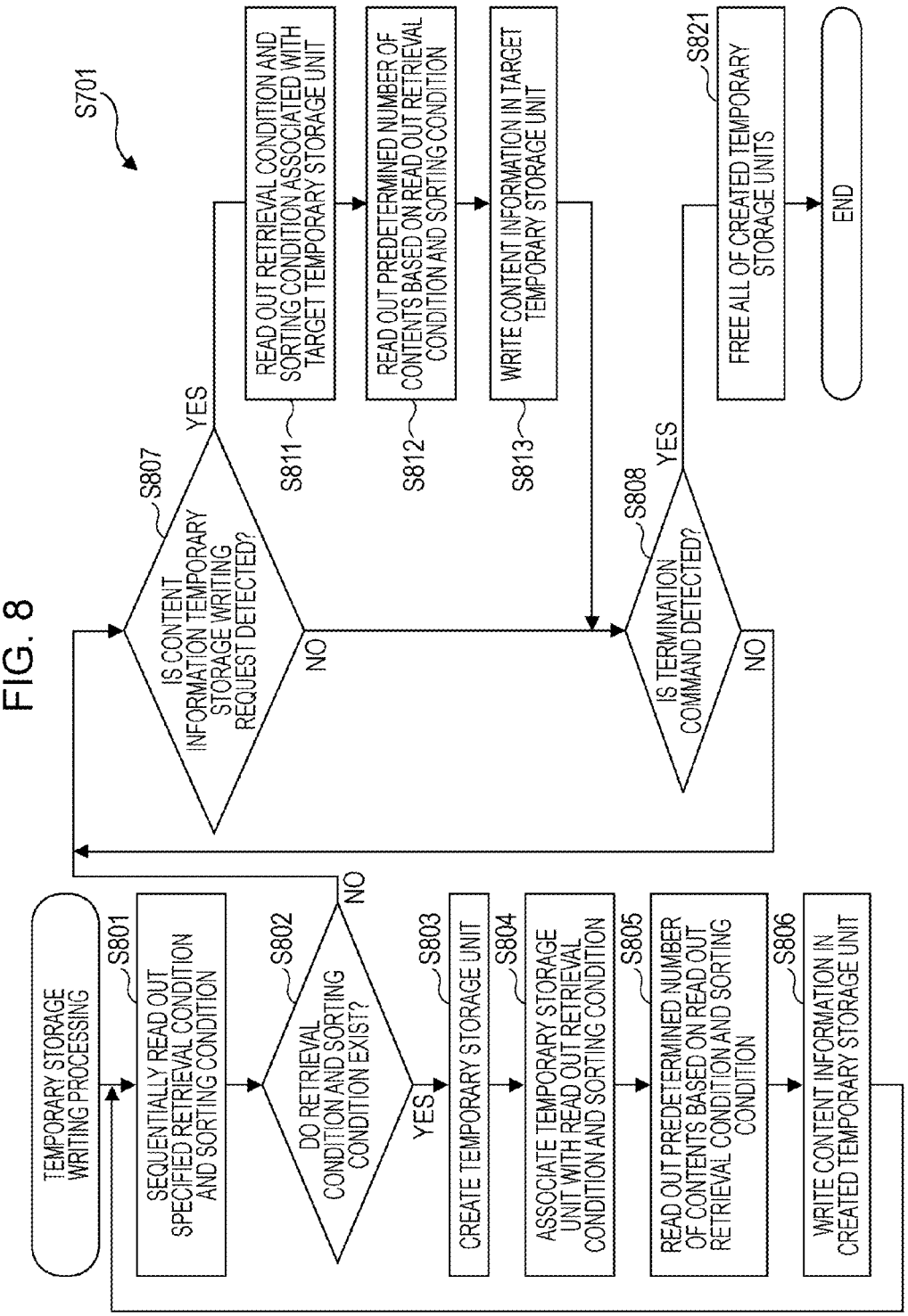
FIG. 8 is a flowchart showing a temporary storage writing process performed by a data access apparatus according to an exemplary embodiment 1 of the present invention.

FIG. 8 is a flowchart illustrating the temporary storage writing process (corresponding to STEP S701) performed by the data access apparatus 100 according to the exemplary embodiment 1. The process shown in FIG. 8 is realized by the CPU 101 executing a predetermined control program loaded to the RAM 103 from the HDD 106.

After the start of the temporary storage writing process, the temporary storage writing unit 203 reads out a pair of a specified retrieval condition and a selectable sorting condition from the content information displaying unit 207 (at STEP S801). In this exemplary embodiment, the selectable sorting conditions are sorting conditions (502-1 to 502-6) displayed at the sorting condition selection button display area 520. Pairs of the specified retrieval condition and the sorting condition "NAME (ASCENDING ORDER)", of the specified retrieval condition and the sorting condition "NAME (DESCENDING ORDER)", and the like are sequentially read out.

After reading out a new pair of the retrieval condition and the sorting condition at STEP S801, the temporary storage writing unit 203 allocates a temporary storage unit corresponding to the database access condition (at STEP S803). The temporary storage writing unit 203 sets association information for associating the temporary storage unit allocated at STEP S803 and an access condition in the access condition associating unit 205 using the read out pair of the retrieval condition and the sorting condition as the access condition (at STEP S804). The temporary storage writing unit 203 registers the correspondence between the access condition and the temporary storage unit as the association information 600. The temporary storage writing unit 203 then reads out a predetermined number of pieces of content information from the content information database unit 202 according to the read out pair of the retrieval condition and the sorting condition (at STEP S805). The temporary storage writing unit 203 then writes the content information read out at STEP S805 in the temporary storage unit allocated at STEP S803 (at STEP S806). The process then returns to STEP S801.

The above-described processing steps are performed for all of the sorting conditions selectable on the user interface screen 500 (FIG. 5). After performing the processing steps until the unprocessed access condition (the retrieval condition and the sorting condition) no longer exists at STEP S802, the association information 600 shown in FIG. 6 is generated in the access condition associating unit 205. At STEPS S801 to S806, a plurality of pieces of content information are read out from the content information database unit 202 (a storage unit) according to each of a plurality of extraction conditions included in the association information and then are stored in corresponding temporary storage unit (memory areas). The temporary storage writing unit 203 detects existence or absence of a content information temporary storage writing request (hereinafter, referred to as a writing request) sent from the reading and displaying process thread (details of which will be described with reference to FIG. 9) activated at STEP S702 (at STEP S807). If the writing request is not detected at STEP S807, the temporary storage writing unit 203 detects existence or absence of a termination command sent from the booting process at STEP S711 of FIG. 7 (at STEP S808). If the termination command is not detected at STEP S808, the process returns to STEP S807.

The writing request issued by the reading and displaying process thread includes information (e.g., an ID of a temporary storage unit) for specifying a temporary storage unit in which content information is written. If the writing request is detected at STEP S807, the temporary storage writing unit 203 reads out the retrieval condition and the sorting condition that are associated with the temporary storage unit targeted by the writing request from the access condition associating unit 205 (at STEP S811). The temporary storage writing unit 203 reads out a predetermined number of pieces of next content information from the content information database unit 202 according to the read out retrieval condition and sorting condition (at STEP S812). The temporary storage writing unit 203 writes the read out content information in the target temporary storage unit (at STEP S813). The process then proceeds to STEP S808.

If the termination command sent from the booting process is detected at STEP S808, the temporary storage writing unit 203 frees all of the temporary storage units allocated at STEP S803 (at STEP S821), and terminates this process.

The selectable retrieval conditions include specification of all of contents. The retrieval condition is an extraction condition used for extracting all of or some of contents stored in the content storage unit 201. When the retrieval condition is changed, the processing of STEPS S801 to S806 is executed again at STEP S913 of FIG. 9, which will be described later. Although the association information 600 shown in FIG. 6 does not include the retrieval condition, each sorting condition may include the retrieval condition.

Figure 9:
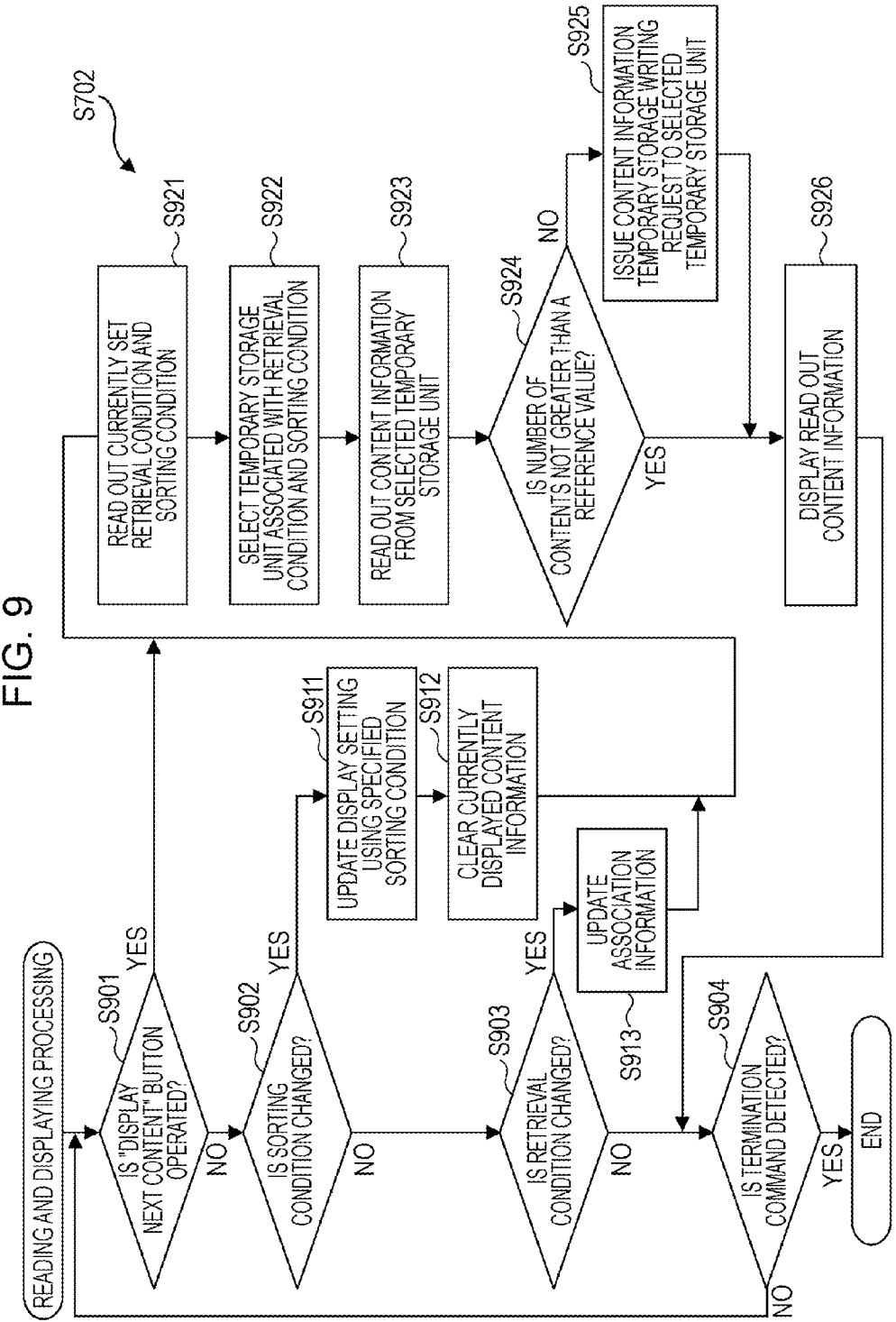
FIG. 9 is a flowchart showing a reading and displaying process performed by a data access apparatus according to an exemplary embodiment 1 of the present invention.

FIG. 9 is a flowchart of a reading and displaying process performed by the data access apparatus 100 according to the exemplary embodiment 1. The process shown in FIG. 9 is a process performed by the content information reading unit 206 that is realized by the CPU 101 executing a predetermined control program loaded to the RAM 103 from the HDD 106.

As shown in FIG. 9, after the start of the reading and displaying process, the content information reading unit 206 detects an operation of the next content display button 530 performed on the user interface screen 500 (at STEP S901). If the operation of the next content display button 530 is not detected, the content information reading unit 206 detects selection of one of the sorting condition selection buttons 502-1 to 502-6 (at STEP S902). If the selection of the sorting condition selection button is not detected, the content information reading unit 206 then determines whether or not the retrieval condition is changed (STEP S903). If the retrieval condition is not changed, the content information reading unit 206 detects a termination command sent from the booting process at STEP S712 of FIG. 7 (at STEP S904). If the termination command is not detected, the process returns to STEP S901.

If the operation of the next content display button is detected at STEP S901, the content information reading unit 206 reads out the currently set retrieval condition and sorting condition (at STEP S921). Here, the currently set retrieval condition corresponds to currently selected retrieval condition. In addition, the currently set sorting condition corresponds to the sorting condition currently selected at the sorting condition selection button display area 520 of the user interface screen 500. Referring to FIG. 5, a sorting condition "NAME (ASCENDING ORDER)" 502-1 is selected. The selected sorting condition is displayed differently to indicate that the condition is currently selected.

The content information reading unit 206 selects a temporary storage unit associated with the currently selected retrieval condition and sorting condition (at STEP S922) and reads out content information from the selected temporary storage unit (STEP S923). The content information reading unit 206 then determines whether or not the number of pieces of unread content information stored in the temporary storage unit after the reading of the content information is not greater than a reference value (at STEP S924). If the number of pieces of content information exceeds the reference value, the content information reading unit 206 displays the content information read out at STEP S923 on the user interface screen 500 (at STEP S926). The process then proceeds to STEP S904. If it is determined that the number of pieces of content information does not exceed the reference value at STEP S924, the content information reading unit 206 issues a request for writing content information in the selected temporary storage unit (the content information temporary storage writing request) to the temporary storage writing process thread described with reference to FIG. 8 (at STEP S925).

If the change of the sorting condition is detected at STEP S902, the content information reading unit 206 changes the display setting using the specified sorting condition (at STEP S911) and clears the currently displayed content information (at STEP S912). The content information reading unit 206 then executes processing of STEPS S921 to S926 described above. Since the content information reading unit 206 switches the display using content information previously buffered in a temporary storage unit in response to the change of the sorting condition, the response speed to the user operation is high. In addition, when the change of the retrieval condition is detected at STEP S903, the content information reading unit 206 executes the processing of STEPS S801 to S806 of FIG. 8 using a new retrieval condition and the above-described selectable sorting condition (at STEP S913). In such a manner, the association information 600 and the temporary storage units 204-1 to 204-N are updated according to the pairs of the new retrieval condition and the sorting conditions (a plurality of newly updated extraction conditions). This can be realized by, for example, controlling the data access apparatus to activate the temporary storage writing process shown in FIG. 8 from the initial state. In addition, if the termination command sent from the booting process shown in FIG. 7 is detected at STEP S904, the content information reading unit 206 terminates this process.

As described above, according to the exemplary embodiment 1, a temporary storage unit is associated with each of sorting conditions selectable at the time of reading and displaying of content information. Content information is read out from a database on the basis of the association and is written in the temporary storage unit. This improves the speed of reading and displaying contents in response to selection of a sorting condition. In addition, since the content of temporary storage units is updated in response to a change of a retrieval condition, the data access apparatus can flexibly cope with the change of the retrieval condition. Accordingly, the data access apparatus can maintain the speed of reading and displaying contents in response to selection of a sorting condition even after the change of the retrieval condition, thereby improving the operability.

Exemplary Embodiment 2

An exemplary embodiment 2 of the present invention will be described in detail next with reference to the accompanying drawings. In the exemplary embodiment 1, the description has been given for a case where sorting conditions or combinations of retrieval conditions and sorting conditions are employed as extraction conditions. In the exemplary embodiment 2, the description will be given for a case where the extraction conditions include refining conditions used for refining the content information. For example, when a condition that the content type is "PHOTOGRAPH" is set as the refining condition, contents having contents IDs of 1 to 3 are extracted from content information 300 shown in FIG. 3. A hardware configuration and a functional configuration according to the exemplary embodiment 2 are the same as (or alternatively similar to) those according to the exemplary embodiment 1 (FIGS. 1 and 2). In addition, an example of a data structure of content information and an example of a data structure of album information according to the exemplary embodiment 2 are the same as (or alternatively similar to) those according to the exemplary embodiment 1 (FIGS. 3 and 4). Furthermore, a processing flow of a booting process according to the exemplary embodiment 2 is also the same as (or alternatively similar to) that according to the exemplary embodiment 1 (FIG. 7).

Figure 10:
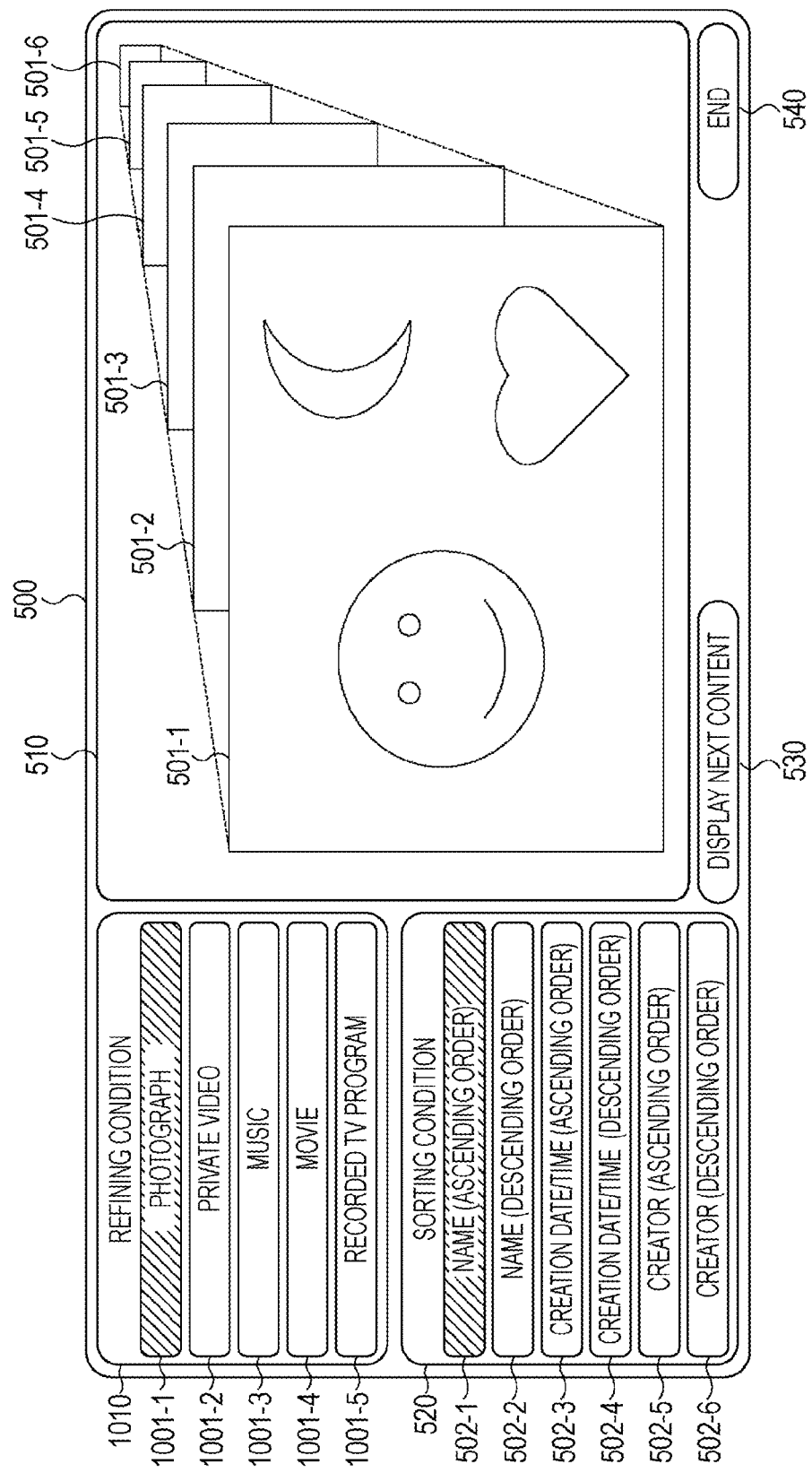
FIG. 10 is a diagram showing an example of a user interface screen according to an exemplary embodiment 2 of the present invention.

FIG. 10 is a diagram showing an example of a user interface screen 500 according to the exemplary embodiment 2. As shown in FIG. 10, the user interface screen 500 includes a content information display area 510, a sorting condition selection button display area 520, a refining condition selection button display area 1010, a next content display button 530, and an end button 540.

The refining condition selection button display area 1010 includes refining condition selection buttons 1001-1 to 1001-5. In the exemplary embodiment 2, in response to selection of one of the refining condition selection buttons 1001-1 to 1001-5, a database access condition is updated on the basis of the selected refining condition. Content information 300 is sequentially read out on the basis of the updated database access condition and the content information display screens 501-1 to 501-6 are updated. Processes according to the exemplary embodiment 2 will be described in detail below.

FIG. 11 is an example of database access condition association information (hereinafter, referred to as association information) according to the exemplary embodiment 2. As shown in FIG. 11, association information 1100 includes an ID of a temporary storage unit, a refining condition, and a sorting condition. The association information 1100 is only an example, and the association information is not limited to this particular example. In addition, the refining condition is an extraction condition used for extracting a specific group of contents stored in the content storage unit 201.

Figure 12:
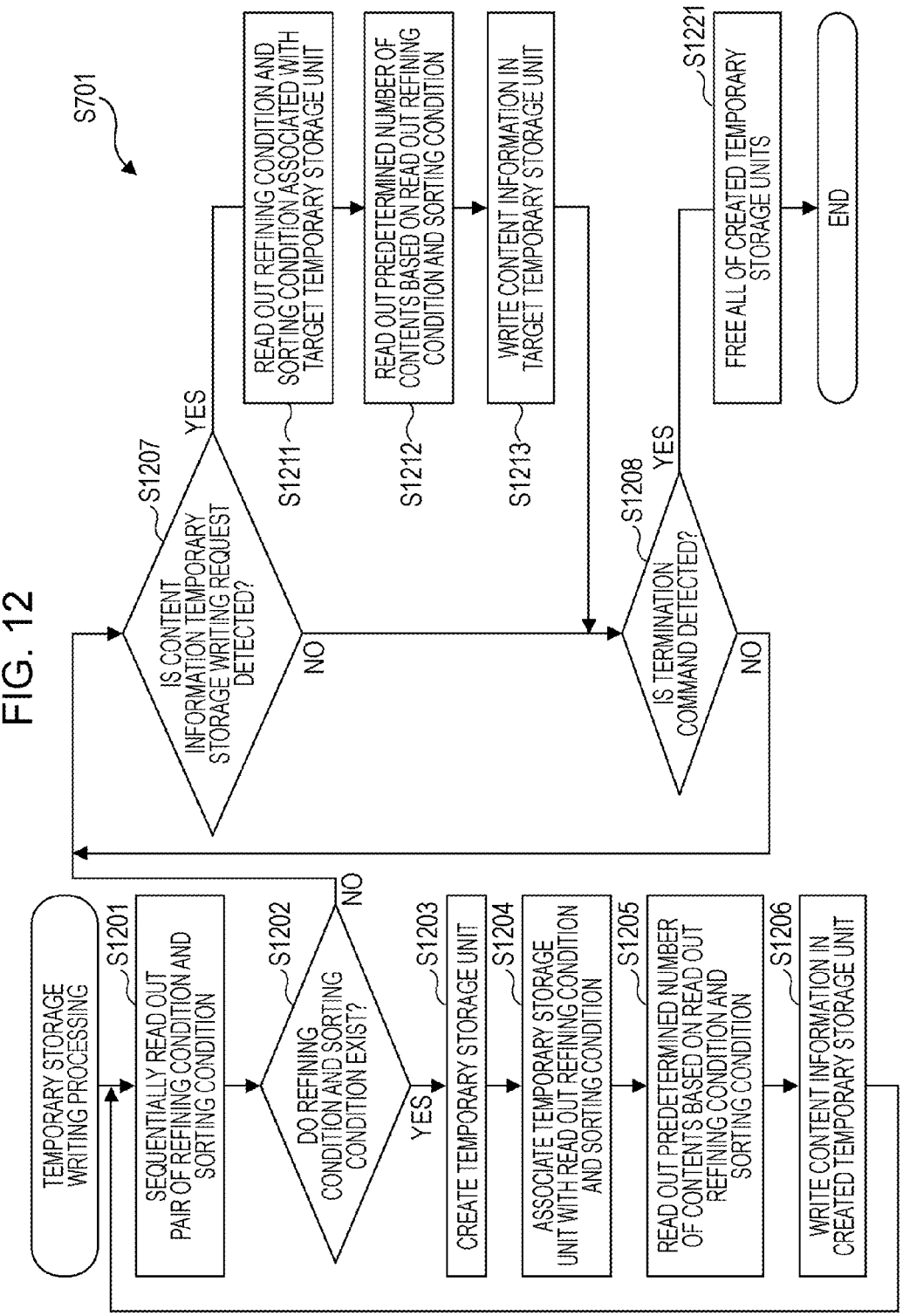
FIG. 12 is a flowchart showing a temporary storage writing process performed by a data access apparatus according to an exemplary embodiment 2 of the present invention.

FIG. 12 is a flowchart illustrating a temporary storage writing process performed by the data access apparatus 100 according to the exemplary embodiment 2. The temporary storage writing unit 203 executes the temporary storage writing process as in the case of the exemplary embodiment 1.

As shown in FIG. 12, after the start of the temporary storage writing process, the temporary storage writing unit 203 reads out a pair of a specified refining condition and a sorting condition from the content information displaying unit 207 (at STEP S1201). For example, a refining condition "PHOTOGRAPH" and a sorting condition "NAME (ASCENDING ORDER)" are specified on the user interface screen 500 shown in FIG. 10. The temporary storage writing unit 203 reads out pairs of the specified refining condition (in this case, "PHOTOGRAPH") and each of selectable sorting conditions (502-1 to 502-6). In addition, the temporary storage writing unit 203 reads out pairs of a specified sorting condition (in this case, "NAME (ASCENDING ORDER)" and each of selectable refining conditions (1001-1 to 1001-5). The temporary storage writing unit 203 sequentially reads out combinations of a refining condition and a sorting condition that can be selected next from the refining condition and the sorting condition currently selected on the user interface screen 500.

Content information may be stored in temporary storage units for combinations of all selectable refining conditions and all selectable sorting conditions. This method is efficient when the number of the combinations of all selectable refining conditions and all selectable sorting conditions is small, since STEPS S1201 to S1206 do not have to be executed even if the refining condition is changed later. However, when there are many combinations, processing of STEPS S1201 to S1206 takes time and requires many temporary storage areas. Thus, this method is not particularly efficient.

After reading out a pair of the unprocessed retrieval condition and sorting condition at STEP S1201, the temporary storage writing unit 203 allocates a temporary storage unit (at STEP S1203). The temporary storage writing unit 203 sets association information for associating the temporary storage unit allocated at STEP S1203 and the pair of the refining condition and the sorting condition in the access condition associating unit 205 (at STEP S1204). The temporary storage writing unit 203 then reads out a predetermined number of pieces of content information from the content information database unit 202 according to the refining condition and the sorting condition (at STEP S1205). The temporary storage writing unit 203 then writes the read out content information in the temporary storage unit allocated at STEP S1203 (at STEP S1206). The process then returns to STEP S1201.

If it is determined that refining condition and the sorting condition to be read out no longer exist at STEP S1202, the process proceeds to STEP S1207. At this time, the association information 1100 described with reference to FIG. 11 has completed. The temporary storage writing unit 203 detects existence or absence of a content information temporary storage writing request (hereinafter, referred to as a writing request) sent from the reading and displaying process thread, which will be described with reference to FIG. 13, at STEP S1207. If the writing request is not detected at STEP S1207, the temporary storage writing unit 203 detects existence or absence of a termination command sent from the booting process shown in FIG. 7 (at STEP S1208). If the termination command is not detected at STEP S1208, the process returns to STEP S1207.

If the writing request is detected at STEP S1207, the temporary storage writing unit 203 reads out a refining condition and a sorting condition that are associated with the temporary storage unit targeted by the writing request from the access condition associating unit 205 (at STEP S1211). The temporary storage writing unit 203 then reads out a predetermined number of pieces of next content information from the content information database unit 202 using the refining condition and sorting condition read out at STEP S1211 (at STEP S1212). The temporary storage writing unit 203 writes the content information read out at STEP S1212 in the target temporary storage unit (at STEP S1213). The process then proceeds to STEP S1208. If the termination command is detected at STEP S1208, the temporary storage writing unit 203 frees all of the temporary storage units allocated at STEP S1203 (at STEP S1221), and terminates this process.

The refining condition, which is a logical multiplication of a retrieval condition specified on a user interface screen (not shown) and a refining key selected through the buttons 1001-1 to 1001-5 shown in FIG. 10, specifies content information in the content information database unit 202. In this exemplary embodiment, a logical multiplication of the refining condition and the retrieval condition is employed as an extraction condition. However, a configuration not employing the retrieval condition is also employable.

Figure 13:
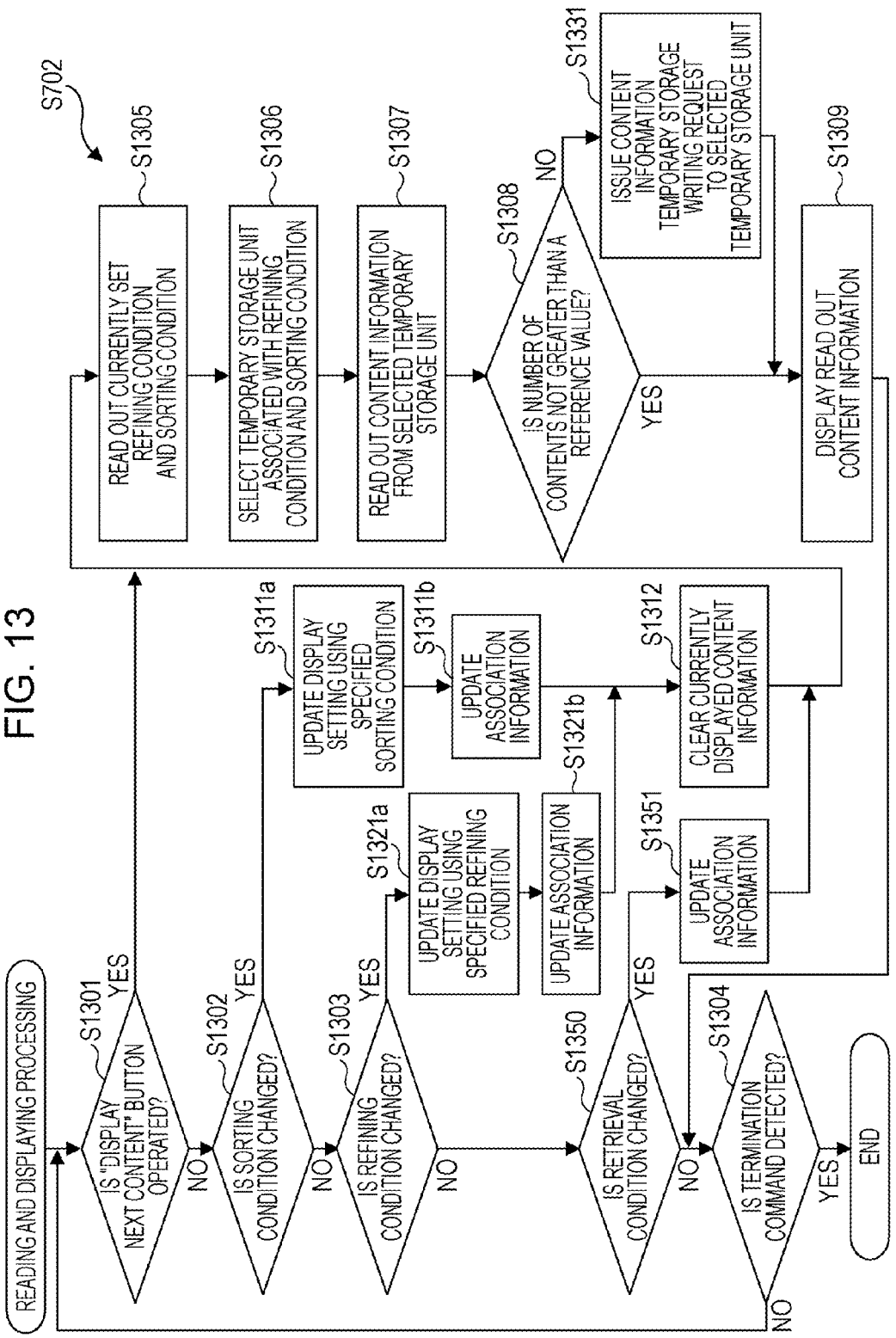
FIG. 13 is a flowchart showing a reading and displaying process performed by a data access apparatus according to exemplary embodiments 2 and 4 of the present invention.

FIG. 13 is a flowchart of a reading and displaying process performed by the data access apparatus 100 according to the exemplary embodiment 2. As shown in FIG. 13, after the start of the reading and displaying process, the content information reading unit 206 detects selection of the next content display button 530 performed on the user interface screen 500 (at STEP S1301). If the selection of the next content display button 530 is not detected at STEP S1301, the content information reading unit 206 detects selection of one of the sorting condition selection buttons 502-1 to 502-6 (at STEP S1302). If the selection of the sorting condition selection button is not detected at STEP S1302, the content information reading unit 206 detects selection of one of the refining condition selection buttons 1001-1 to 1001-5 (at STEP S1303). If the selection of the button is not detected at STEP S1303, the content information reading unit 206 then determines whether or not the retrieval condition is changed (STEP S1350). If the retrieval condition is not changed, the content information reading unit 206 detects existence or absence of a termination command sent from the booting process shown in FIG. 7 (at STEP S1304). If the termination command is not detected at STEP S1304, the process returns to STEP S1301.

If the operation of the next content display button is detected at STEP S1301, the content information reading unit 206 reads out the currently set refining condition and sorting condition (at STEP S1305). The content information reading unit 206 selects a temporary storage unit associated with the currently set refining condition and sorting condition with reference to the association information 1100 (at STEP S1306). The content information reading unit 206 reads out content information from the temporary storage unit selected at STEP S1306 (at STEP S1307). The content information reading unit 206 then determines whether or not the number of pieces of unread content information stored in the temporary storage unit after the reading of the content information is not greater than a reference value (at STEP S1308). If the number of pieces of content information exceeds the reference value, the content information reading unit 206 displays the read out content information (at STEP S1309). The process then proceeds to STEP S1304. On the other hand, if it is determined that the number of pieces of content information does not exceed the reference value at STEP S1308, the content information reading unit 206 issues a request for writing content information in the temporary storage unit (the content information temporary storage writing request) to the temporary storage writing process thread described with reference to FIG. 12 (at STEP S1331). The process then proceeds to STEP S1309.

If the change of the sorting condition is detected at STEP S1302, the content information reading unit 206 changes the display setting using the specified sorting condition (at STEP S1311a). For example, when the association information has a content shown in FIG. 11 and the sorting condition is changed to a sorting condition "CREATION DATE/TIME (ASCENDING ORDER)", the display setting is changed according to the conditions "PHOTOGRAPH" and "CREATION DATE/TIME (ASCENDING ORDER)". Thus, the temporary storage unit having an ID of 7 is selected at STEP S1306.

The content information reading unit 206 causes the temporary storage writing unit 203 to execute processing of STEPS S1201 to S1206 regarding pairs of refining conditions except for the currently selected one and a new sorting condition. As a result, the sorting condition associated with the temporary storage units having IDs of 2 to 5 is changed to another sorting condition (in the above-described example, from "NAME (ASCENDING ORDER)" to "CREATION DATE/TIME (ASCENDING ORDER)"), and the content of the corresponding storage units is also updated. The content information reading unit 206 then clears the currently displayed content information (at STEP S1312). Thereafter, the process proceeds to STEP S1305.

If the change of the refining condition is detected at STEP S1303, the content information reading unit 206 changes the display setting using the specified refining condition (at STEP S1321a). For example, when the association information has the content shown in FIG. 11 and the refining condition is changed to "PRIVATE VIDEO", the display setting is changed according to the conditions "PRIVATE VIDEO" and "NAME (ASCENDING ORDER)". Accordingly, a temporary storage unit having an ID of 2 is selected at STEP S1306.

The content information reading unit 206 causes the temporary storage writing unit 203 to execute processing of STEPS S1201 to S1206 regarding pairs of sorting conditions except for the currently selected one and a new refining condition. As a result, the refining condition associated with the temporary storage units having IDs of 6 to 10 shown in FIG. 11 is changed to another refining condition (in the above-described example, from "PHOTOGRAPH" to "PRIVATE VIDEO") and the content of the corresponding temporary storage units is also updated. The content information reading unit 206 then clears the currently displayed content information (at STEP S1312). Thereafter, the process proceeds to STEP S1305. If the change of the retrieval condition is detected at STEP S1350, the content information reading unit 206 causes the temporary storage writing unit 203 to execute processing of STEPS S1201 to S1206 of FIG. 12 according the new retrieval condition and the above-described database access condition (S1351). This can be realized by, for example, controlling the data access apparatus to activate the temporary storage writing process shown in FIG. 12 from the initial state. In addition, if the termination command sent from the booting process shown in FIG. 7 is detected at STEP S1304, the content information reading unit 206 terminates this process.

As described above, according to the exemplary embodiment 2, a temporary storage unit is associated with each pair of a sorting condition and a refining condition that are selectable at the time of reading and displaying of content information. Content information is read out from a database on the basis of the association information and is written in the temporary storage unit. This improves the speed of reading and displaying contents in response to selection of a sorting condition or a refining condition. In addition, content information corresponding to pairs of a sorting condition and a refining condition that can be selected next on a user interface screen is written in temporary storage units in advance in response to a change of a sorting condition or a refining condition. Accordingly, since content information regarding pairs of a sorting condition and a refining condition that can be selected next on a user interface screen is buffered in temporary storage units in advance, the response speed to user operations improves.

Exemplary Embodiment 3

An exemplary embodiment 3 will be described in detail next with reference to the accompanying drawings. In the exemplary embodiment 3, the description will be given for a case where a grouping condition is employed as an extraction condition. The grouping condition is used for classifying content information having an identical content regarding a specified information item into an identical group. For example, when there are content information and album information shown in FIGS. 3 and 4, respectively, and a grouping condition of "album" is specified, a first group including content information having content IDs of 1 and 4 (having an album ID of 1), a second group including content information having a content ID of 2 (having an album ID of 2), a third group including content information having content IDs of 3 and 7 (having an album ID of 3), and a fourth group including content information having content IDs of 5 and 6 (having an album ID of 4) are formed. When a grouping condition "CREATOR" is specified, a first group including content information having content IDs of 1, 3, and 4 (created by Mike), a second group including content information having content IDs of 2 and 6 (created by Mary), and a third group including content information having content IDs of 5 and 7 (created by Tom) are formed. In addition, when a grouping condition "MONTH" of the creation date and time is specified, a first group including content information having content IDs of 1 and 2 (created in December 2002), a second group including content information having content IDs of 3 and 4 (created in March 2005), a third group including content information having a content ID of 5 (created in April 2005), a fourth group including content information having a content ID of 6 (created in May 2005), and a fifth group including content information having a content ID of 7 (created in June 2005) are formed.

Similarly, groups according to grouping conditions of "content type", "year of the creation date and time", "initial (e.g., A, B, C, . . . ) of the creator", and "a range of initials (e.g., A to E, H to L, . . . ) of the creator" are formed. However, groups to be formed are not limited to this particular example.

A hardware configuration and a functional configuration according to the exemplary embodiment 3 are the same as (or alternatively similar to) those according to the exemplary embodiment 1 (FIGS. 1 and 2). In addition, an example of a data structure of content information and an example of a data structure of album information according to the exemplary embodiment 3 are the same as (or alternatively similar to) those according to the exemplary embodiment 1 (FIGS. 3 and 4). Furthermore, a processing flow of a booting process according to the exemplary embodiment 3 is also the same as (or alternatively similar to) that according to the exemplary embodiment 1 (FIG. 7).

Figure 14:
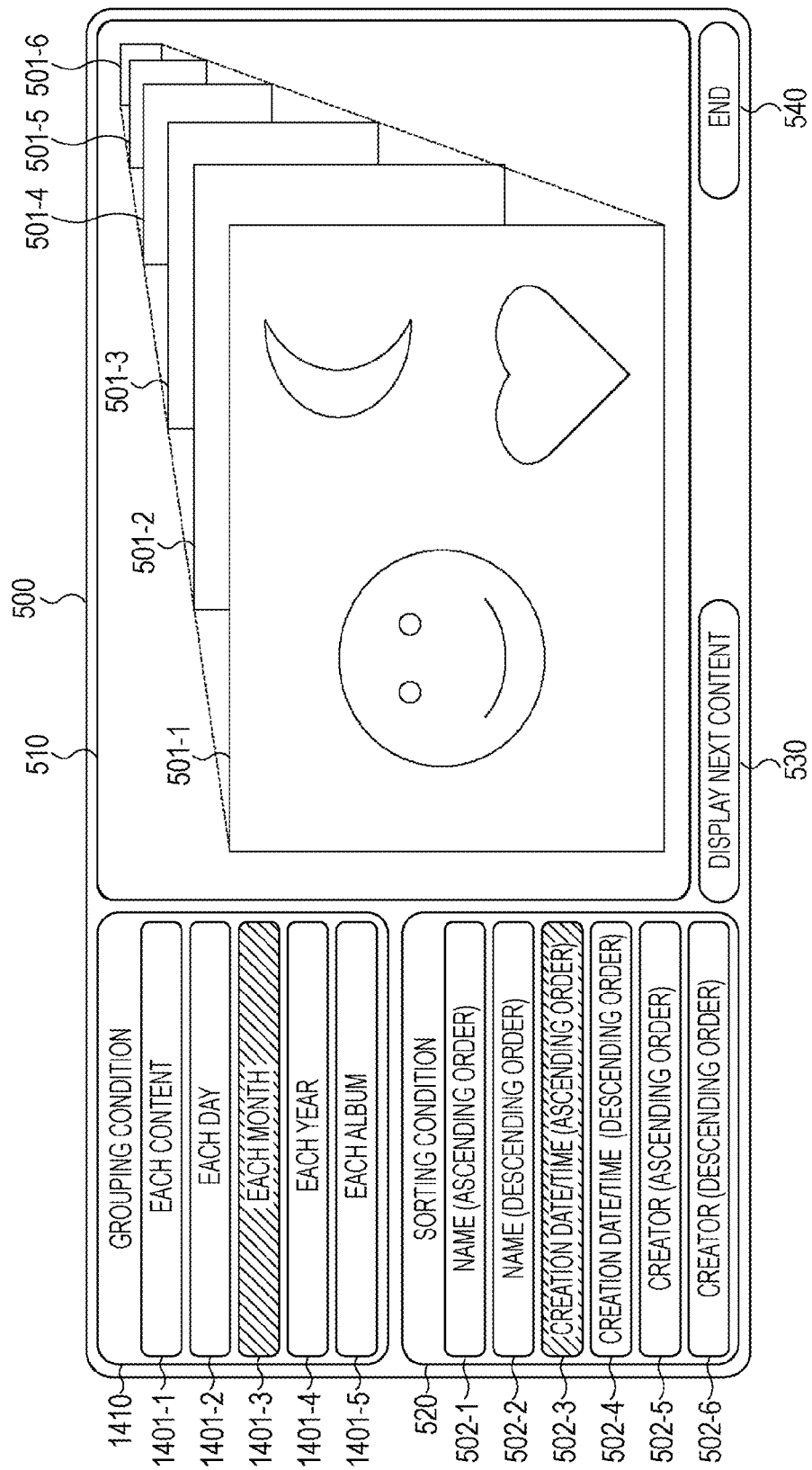
FIG. 14 is a diagram showing an example of a user interface screen according to an exemplary embodiment 3 of the present invention.

FIG. 14 shows an example of a user interface screen 500 according to the exemplary embodiment 3. As shown in FIG. 14, the user interface screen 500 includes a content information display area 510, a sorting condition selection button display area 520, a grouping condition selection button display area 1410, a next content display button 530, and an end button 540.

The grouping condition selection button display area 1410 includes grouping condition selection buttons 1401-1 to 1401-5. In response to selection of one of the grouping condition selection buttons 1401-1 to 1401-5, a database access condition is updated on the basis of the selected grouping condition. Content information is sequentially read out on the basis of the updated database access condition and content information display screens 501-1 to 501-6 are updated.

The grouping condition is a condition that allows a plurality of pieces of content information having an identical condition to be collectively handled as a set of contents (a group of contents). For example, when an "EACH MONTH" button 1401-3 is selected, content information created in an identical month, which is included in the creation date and time of metadata, is handled as a set of contents. For example, when a content representing January 2006 is displayed at the content information display screen 501-1, a content representing February 2006 is displayed at the content information display screen 501-2. For example, a content that comes first in each group classified according to the specified sorting condition is employed as the representative content. In response to selection of one of the representative contents at the content information display area 510, content information of contents belonging to the selected group is sequentially displayed according to the specified sorting condition.

FIG. 15 is an example of database access condition association information (hereinafter, referred to as association information) according to the exemplary embodiment 3. As shown in FIG. 15, association information 1500 according to the exemplary embodiment 3 includes an ID of a temporary storage unit, a sorting condition and a grouping condition. It is assumed that pairs of sorting conditions and grouping conditions included in the association information 1500 are created and held in advance. The association information 1500 is only an example, and the association information is not limited to this particular example. Meanwhile, there is a correlation between the grouping condition and the sorting condition. For example, when grouping conditions "EACH YEAR", "EACH MONTH", and "EACH DAY" are employed, content information is generally sorted by the creation date and time but not by the file name. Thus, unlike the refining condition employed in the exemplary embodiment 2, the association information does not have to include combinations of all of the conditions that are selectable next.

Figure 16:
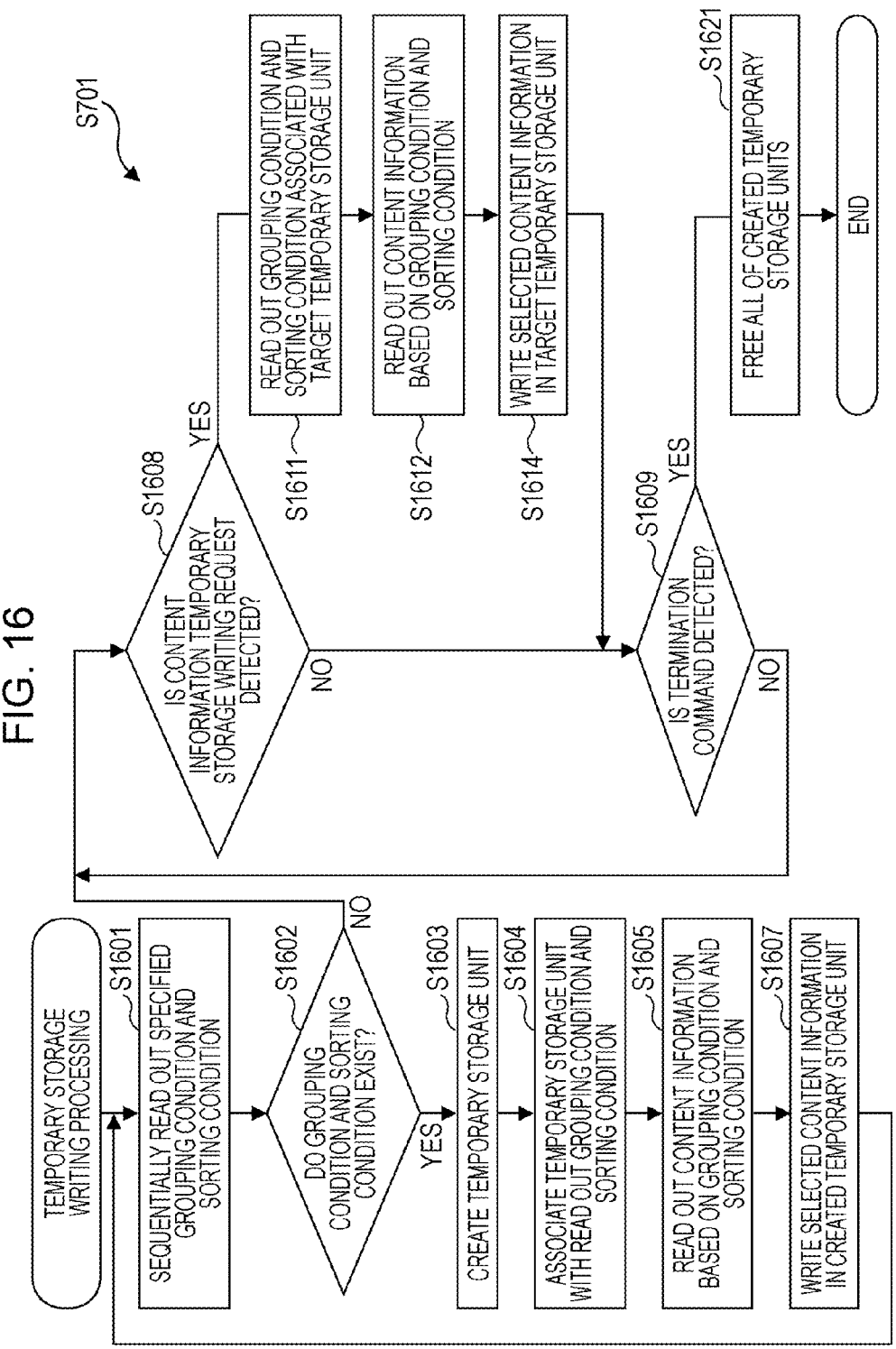
FIG. 16 is a flowchart showing a temporary storage writing process performed by a data access apparatus according to an exemplary embodiment 3 of the present invention.

FIG. 16 is a flowchart illustrating a temporary storage writing process performed by the data access apparatus 100 according to the exemplary embodiment 3. As shown in FIG. 16, after the start of the temporary storage writing process, the temporary storage writing unit 203 reads out a specified set of a grouping condition and a sorting condition from the content information displaying unit 207 (at STEP S1601). For example, a grouping condition "EACH MONTH" and a sorting condition "CREATION DATE/TIME (ASCENDING ORDER)" are specified on the user interface screen 500 shown in FIG. 14. When the grouping condition "EACH MONTH" is selected, the buttons 1401-5, 502-1, 502-2, 502-5, and 502-6 shown in FIG. 14 are practically unselectable. Accordingly, these unselectable buttons may be hidden or grayed out. Combinations of grouping conditions and sorting conditions that can be selected next on the user interface screen 500 from the currently selected grouping condition and sorting condition are set as the database access condition association information shown in FIG. 15. For example, when the conditions "EACH MONTH" and "CREATION DATE/TIME (ASCENDING ORDER)" are selected, association information similar to the association information 1500 shown in FIG. 15 is created on the basis of pairs of sorting conditions and grouping conditions (not shown) that have been created and stored in advance. More specifically, the association information is created on the basis of pairs of the grouping condition "EACH MONTH" and sorting conditions (e.g., the creation date/time (ascending order)) associated with the grouping condition "EACH MONTH" and pairs of the sorting condition "CREATION DATE/TIME (ASCENDING ORDER)" and grouping conditions (e.g., "EACH CONTENT", "EACH DAY", and "EACH MONTH") associated with the sorting condition "CREATION DATE/TIME (ASCENDING ORDER)".

After reading out an unprocessed pair of a grouping condition and a sorting condition at STEP S1601, the temporary storage writing unit 203 allocates a temporary storage unit (at STEP S1603). The temporary storage writing unit 203 sets association information for associating the temporary storage unit allocated at STEP S1603 and the pair of the grouping condition and the sorting condition in the access condition associating unit 205 (at STEP S1604). The temporary storage writing unit 203 then reads out a predetermined number of pieces of content information from the content information database unit 202 according to the read out grouping condition and sorting condition (at STEP S1605). For example, when the grouping condition "EACH MONTH" is selected, the temporary storage writing unit 203 acquires a predetermined number of pieces of content information that come first of each group of month (hereinafter, referred to as representative content information) from the content information read out according to the sorting condition. The temporary storage writing unit 203 then writes the acquired content information in the temporary storage unit allocated at STEP S1603 (at STEP S1607). The process then returns to STEP S1601.

If it is determined that the pair of the grouping condition and the sorting condition to be read out no longer exist at STEP S1602, the process proceeds to STEP S1608. At this time, the association information 1500 described with reference to FIG. 15 has completed. The temporary storage writing unit 203 detects existence or absence of a content information temporary storage writing request (hereinafter, referred to as a writing request) sent from a reading and displaying process thread, which will be described with reference to FIG. 17, at STEP S1608. If the writing request is not detected at STEP S1608, the temporary storage writing unit 203 detects existence or absence of a termination command sent from the booting process shown in FIG. 7 (at STEP S1609). If the termination command is not detected at STEP S1609, the process returns to STEP S1608.

If the writing request is detected at STEP S1608, the temporary storage writing unit 203 reads out a pair of a grouping condition and a sorting condition that are associated with the temporary storage unit targeted by the writing request from the access condition associating unit 205 (at STEP S1611). The temporary storage writing unit 203 then reads out representative content information of a next group from the content information database unit 202 according to the read out grouping condition and sorting condition (at STEP S1612). The temporary storage writing unit 203 writes the representative content information selected at STEP S1612 in the target temporary storage unit (at STEP S1614). The process then proceeds to STEP S1609. If the termination command is detected at STEP S1609, the temporary storage writing unit 203 frees all of the temporary storage units allocated at STEP S1603 (at STEP S1621) and terminates this process.

The grouping condition, which is a logical multiplication of a predetermined retrieval condition (not shown) and a grouping condition selected through the buttons 1401-1 to 1401-5 shown in FIG. 14, specifies content information in the content information database unit 202. In this exemplary embodiment, a logical multiplication of the retrieval condition and the grouping condition is employed as an extraction condition. However, a retrieval condition may be omitted.

Figure 17:
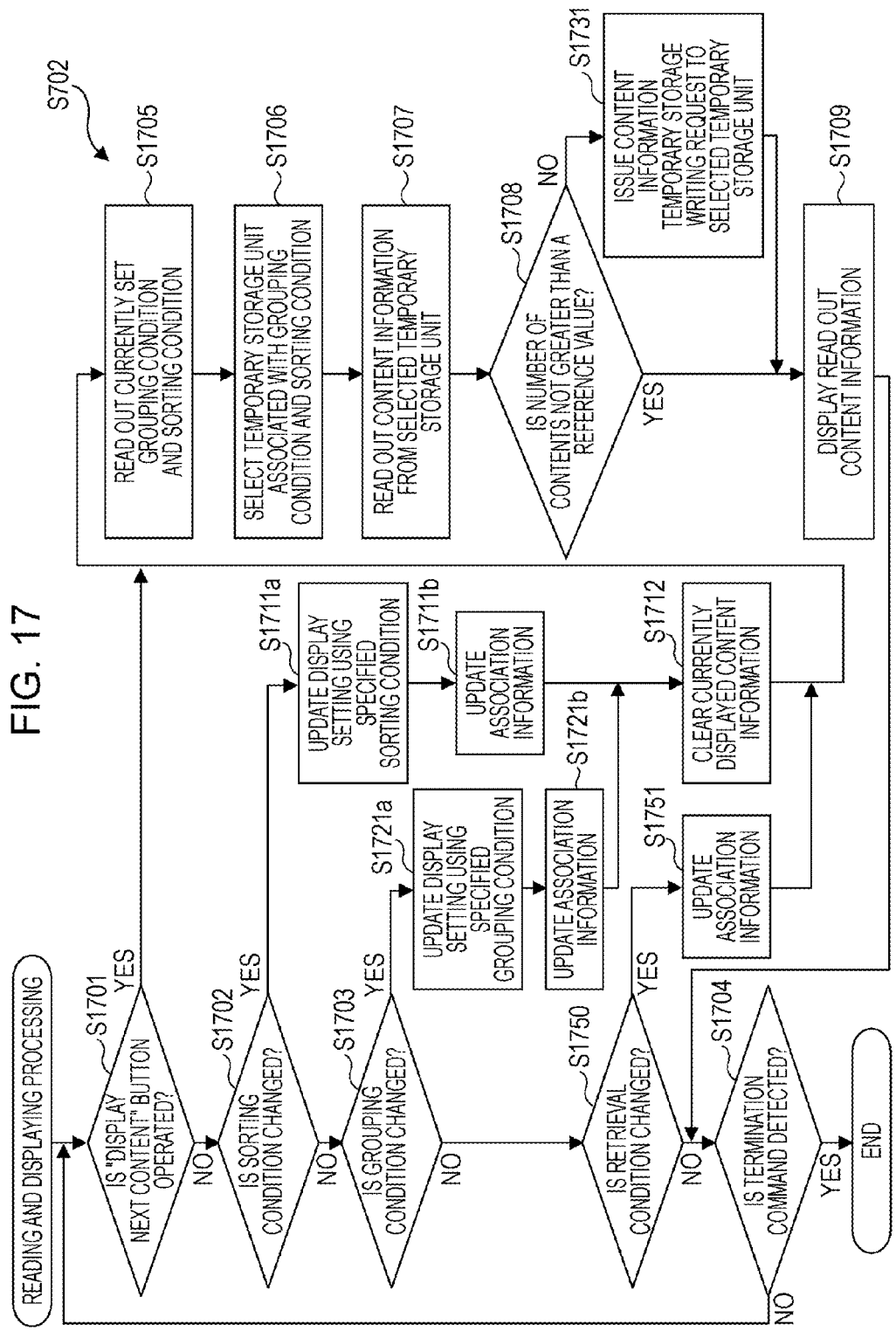
FIG. 17 is a flowchart showing a reading and displaying process performed by a data access apparatus according to an exemplary embodiment 3 of the present invention.

FIG. 17 is a flowchart showing a reading and displaying process performed by the data access apparatus 100 according to the exemplary embodiment 3. As shown in FIG. 17, after the start of the reading and displaying process, the content information reading unit 206 detects selection of the next content display button 530 performed on the user interface screen 500 (at STEP S1701). If the selection of the next content display button 530 is not detected at STEP S1701, the content information reading unit 206 detects selection of one of the sorting condition selection buttons 502-1 to 502-6 (at STEP S1702). If the selection of the sorting condition selection button is not detected at STEP S1702, the content information reading unit 206 detects selection of one of the grouping condition selection buttons 1401-1 to 1401-5 (at STEP S1703). If the selection of the button is not detected at STEP S1703, the content information reading unit 206 then determines whether or not the retrieval condition is changed (STEP S1750). If the change of the retrieval condition is not detected at STEP S1750, the content information reading unit 206 detects existence or absence of a termination command sent from the booting process of FIG. 7 (at STEP S1704). If the termination command is not detected at STEP S1704, the process returns to STEP S1701.

If the operation of the next content display button is detected at STEP S1701, the content information reading unit 206 reads out the currently set grouping condition and sorting condition (at STEP S1705). The content information reading unit 206 selects a temporary storage unit associated with the currently set grouping condition and sorting condition with reference to the association information 1500 (at STEP S1706). The content information reading unit 206 reads out content information from the temporary storage unit selected at STEP S1706 (at STEP S1707). The content information reading unit 206 then determines whether or not the number of pieces of unread content information stored in the temporary storage unit after the reading of the content information is not greater than a reference value (at STEP S1708). If it is determined that the number of pieces of content information exceeds the reference value, the content information reading unit 206 displays the read out content information (at STEP S1709). The process then proceeds to STEP S1704. On the other hand, if it is determined that the number of pieces of content information does not exceed the reference value at STEP S1708, the content information reading unit 206 issues a request for writing content information in the temporary storage unit (the content information temporary storage writing request) to the temporary storage writing process thread described with reference to FIG. 16 (at STEP S1731). The process then proceeds to STEP S1709.

If the change of the sorting condition is detected at STEP S1702, the content information reading unit 206 changes the display setting using the specified sorting condition (at STEP S1711a). For example, suppose that the association information has a content shown in FIG. 15 and the grouping condition "EACH CONTENT" and the sorting condition "NAME (ASCENDING ORDER)" are selected. If the sorting condition is changed to "CREATION DATE/TIME (ASCENDING ORDER)" from this state, the display setting is changed according to the conditions "EACH CONTENT" and "CREATION DATE/TIME (ASCENDING ORDER)". Thus, a temporary storage unit having an ID of 3 is selected at STEP S1706.

The content information reading unit 206 causes the temporary storage writing unit 203 to execute processing of STEPS S1601 to S1607 regarding pairs of new grouping conditions and sorting conditions other than the currently selected grouping condition and sorting condition (at STEP S1711b). Here, the association information 1500 is based on the pairs of sorting conditions and grouping conditions (not shown) having been created and stored in advance. Thus, the association information 1500 is updated on the basis of the pairs of the selected sorting condition and the grouping conditions associated with the selected sorting condition and the pairs of the selected grouping condition and the sorting conditions associated with the selected grouping condition. The content information reading unit 206 then clears the currently displayed content information (at STEP S1712). Thereafter, the process proceeds to STEP S1705.

If the change of the grouping condition is detected at STEP S1703, the content information reading unit 206 changes the display setting using the specified grouping condition (at STEP S1721a). For example, when the association information has the content shown in FIG. 15 and the grouping condition is changed from "EACH MONTH" to "EACH DAY", the display setting is changed according to the conditions "EACH DAY" and "CREATION DATE/TIME (ASCENDING ORDER)". Accordingly, a temporary storage unit having an ID of 4 is selected at STEP S1706.

The content information reading unit 206 causes the temporary storage writing unit 203 to execute processing of STEPS S1601 to S1607 regarding the pairs of new sorting conditions and grouping conditions except for the currently selected sorting condition and grouping condition (at STEP S1721b). Here, the association information 1500 is based on the pairs of sorting conditions and grouping conditions (not shown) having been created and stored in advance. Thus, the association information 1500 is updated on the basis of the pairs of the selected sorting condition and the grouping conditions associated with the selected sorting condition and the pairs of the selected grouping condition and the sorting conditions associated with the selected grouping condition. The content information reading unit 206 then clears the currently displayed content information (at STEP S1712). Thereafter, the process proceeds to STEP S1705.

If the change of the retrieval condition is detected at STEP S1750, the content information reading unit 206 causes the temporary storage writing unit 203 to execute processing of STEPS S1601 to S1607 of FIG. 16 according the new retrieval condition and the above-described database access condition (S1751). This can be realized by, for example, controlling the data access apparatus to activate the temporary storage writing process shown in FIG. 16 from the initial state. In addition, if the termination command sent from the booting process shown in FIG. 7 is detected at STEP S1704, the content information reading unit 206 terminates this process. In response to the selection of one of the displayed buttons 501-1 to 501-6 through selection of a grouping condition, the processes described in the exemplary embodiment 2 are executed using the selected condition as a refining condition. For example, when the grouping condition "EACH MONTH" is selected, users can select a target month and the selected month is used as the refining condition. Accordingly, appropriate content information is stored in each of the temporary storage units 204 by executing the processes described in the exemplary embodiment 2.

According to the exemplary embodiment 3, a temporary storage unit is associated with each set of a sorting condition and a grouping condition that are selectable at the time of reading and displaying of content information. Content information is read out from a database on the basis of the association information and is written in the temporary storage unit. This improves the speed of reading and displaying contents that is performed after selection of a sorting condition or a grouping condition.

Exemplary Embodiment 4

An exemplary embodiment 4 will be described in detail next with reference to the accompanying drawings. A hardware configuration according to the exemplary embodiment 4 is the same as (or alternatively similar to) that according to the exemplary embodiment 1 (FIG. 1). In addition, an example of a data structure of content information and an example of a data structure of album information according to the exemplary embodiment 4 are the same as (or alternatively similar to) those according to the exemplary embodiment 1 (FIGS. 3 and 4). Furthermore, a processing flow of a booting process according to the exemplary embodiment 4 is also the same as (or alternatively similar to) that according to the exemplary embodiment 1 (FIG. 7). Moreover, a processing flow of a reading and displaying process according to the exemplary embodiment 4 is the same as (or alternatively similar to) that according to the exemplary embodiment 2 (FIG. 13).

Figure 18:
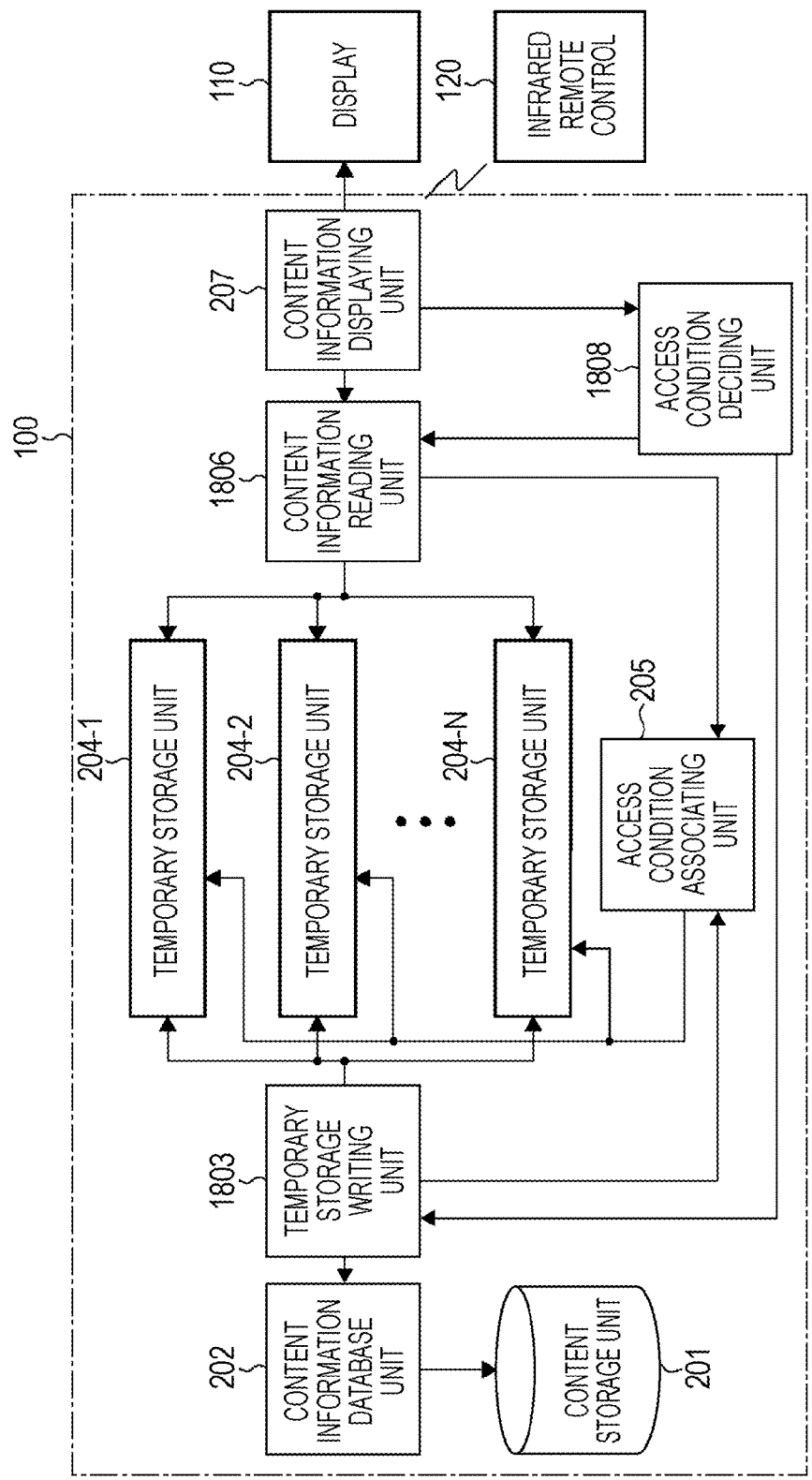
FIG. 18 is a diagram showing a functional configuration of a data access apparatus according to an exemplary embodiment 4 of the present invention.

FIG. 18 is a diagram showing a functional configuration of a data access apparatus according to the exemplary embodiment 4. As shown in FIG. 18, the data access apparatus 100 has a content storage unit 201, a content information database unit 202, a temporary storage writing unit 1803, temporary storage units 204-1 to 204-N, an access condition associating unit 205, a content information reading unit 1806, a content information displaying unit 207, and a access condition deciding unit 1808.

The temporary storage writing unit 1803 sets a database access condition decided by the access condition deciding unit 1808 in the access condition associating unit 205. The temporary storage writing unit 1803, like the above-described temporary storage writing unit 203, reads out content information from the content information database unit 202 on the basis of the setting of the access condition associating unit 205 and writes the read out content information in the corresponding one of the temporary storage unit 204-1 to 204-N.

The access condition deciding unit 1808 decides a database access condition to be processed by the temporary storage writing unit 1803 on the basis of a changed refining condition and access condition deciding information 2700a and 2700b (FIGS. 27A and 27B) when the refining condition is changed. The access condition deciding information 2700a and 2700b according to this exemplary embodiment defines sorting conditions available under each refining condition. Upon a refining condition being set on a user interface screen, the temporary storage writing unit 1803 and the content information reading unit 1806 acquire a set of sorting conditions available under the refining condition on the basis of the set refining condition and the access condition defining information.

FIG. 19 shows an example of photograph content information (content information of contents having a content type "PHOTOGRAPH") according to the exemplary embodiment 4. As shown in FIG. 19, the photograph content information 1900 includes metadata, such as a photograph ID, a corresponding content ID, a camera type, a capturing mode, and a resolution. The photograph content information 1900 is only an example and is not limited to this particular example.

FIG. 20 shows an example of private video content information (content information of contents having a content type "PRIVATE VIDEO") according to the exemplary embodiment 4. As shown in FIG. 20, the private video content information 2000 includes metadata, such as a private video ID, a corresponding content ID, a camera type, and a capturing mode. The private video content information 2000 is only an example and is not limited to this particular example.

FIG. 21 shows an example of music content information (content information of contents having a content type "MUSIC") according to the exemplary embodiment 4. As shown in FIG. 21, the music content information 2100 includes metadata, such as a music ID, a corresponding content ID, a song title, an artist name, a genre, and duration. The music content information 2100 is only an example and is not limited to this particular example.

FIG. 22 shows an example of movie content information (content information of contents having a content type "MOVIE") according to the exemplary embodiment 4. As shown in FIG. 22, the movie content information 2200 includes metadata, such as a movie ID, a corresponding content ID, a movie title, a director name, a leading performer name, and duration. The movie content information 2200 is only an example and is not limited to this particular example.

FIG. 23 shows an example of recorded TV program content information (content information of contents having a content type "RECORDED TV PROGRAM") according to the exemplary embodiment 4. As shown in FIG. 23, the recorded TV program content information 2300 includes metadata, such as a recorded TV program ID, a corresponding content ID, a program title, a category, a broadcasting station name, a main cast name, and a sub cast name. The recorded TV program content information 2300 is only an example and is not limited to this particular example.

FIGS. 24A to 24F show examples of database access condition association information (hereinafter, referred to as association information) employable by the access condition associating unit 205 according to the exemplary embodiment 4. As shown in FIGS. 24A to 24F, association information 2400a to 2400f includes an ID of a temporary storage unit and a sorting condition and is switched according to a refining condition. The association information 2400a is used for default contents, while the association information 2400b is used for photograph contents. The association information 2400c is used for music contents. Similarly, association information 2400d, 2400e, and 2400f are used for private video contents, movie contents, and recorded TV program contents, respectively. For example, the association information 2400b for photograph contents includes metadata, such as "CAMERA TYPE", "CAPTURING MODE", and "RESOLUTION", included in the content information 1900 of the photograph contents shown in FIG. 19. The above-described association information 2400 is only an example and the association information is not limited to this particular example. The access condition deciding unit 1808 decides the type of the association information to be set in the access condition associating unit 205 according to the specified refining condition.

Figure 25:
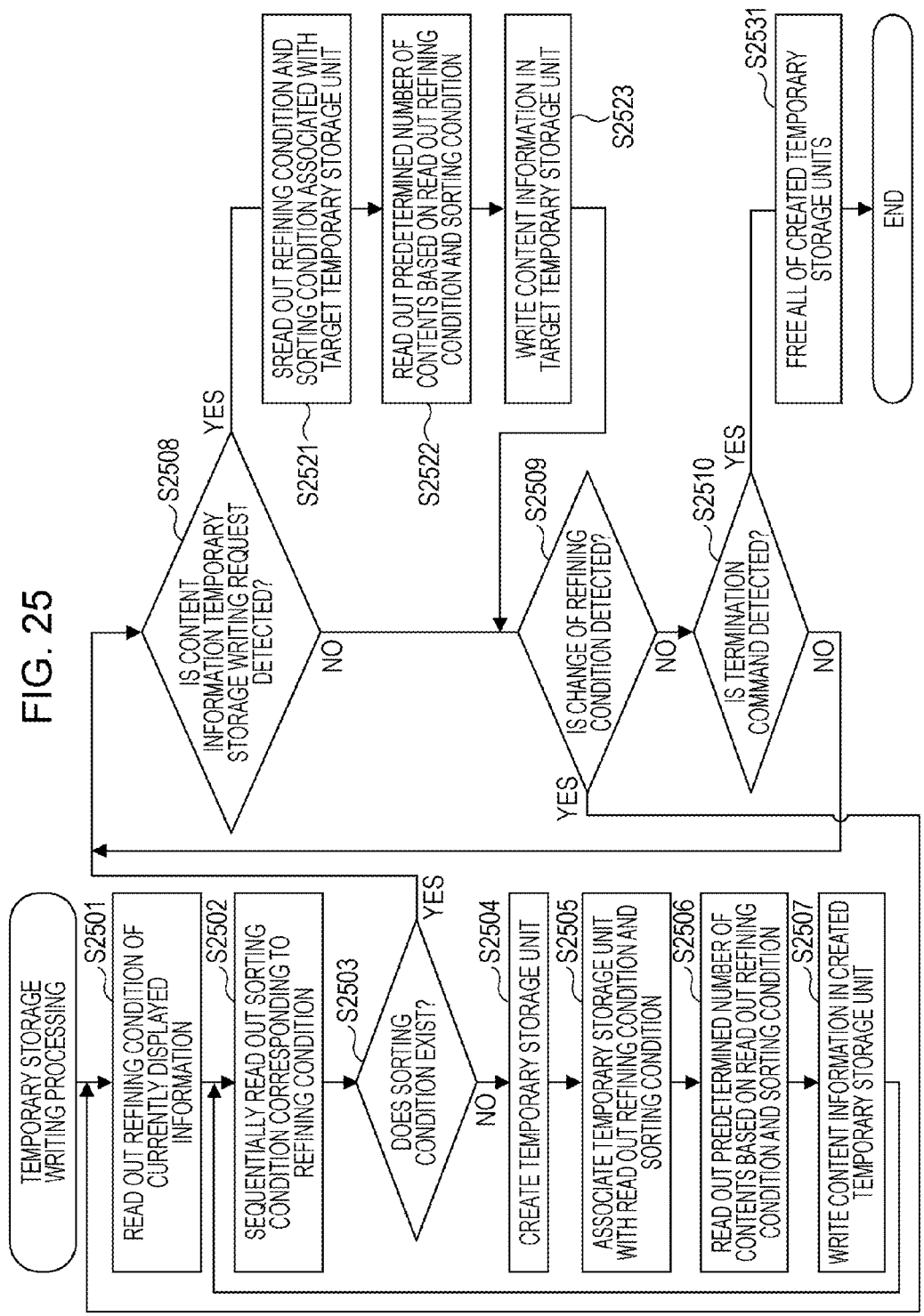
FIG. 25 is a flowchart showing a temporary storage writing process performed by a data access apparatus according to an exemplary embodiment 4 of the present invention.

FIG. 25 is a flowchart illustrating a temporary storage writing process performed by the data access apparatus 100 according to the exemplary embodiment 4.

As shown in FIG. 25, after the start of the temporary storage writing process, the access condition deciding unit 1808 reads out a currently displayed refining condition from the content information displaying unit 207 (at STEP S2501). The access condition deciding unit 1808 decides a set of sorting conditions corresponding to the read out refining condition. The temporary storage writing unit 1803 sequentially reads out a sorting condition from the set of sorting conditions decided by the access condition deciding unit 1808 (STEP S2502). After reading out the sorting condition, the temporary storage writing unit 1803 allocates a temporary storage unit corresponding to the sorting condition (at STEP S2504). The temporary storage writing unit 1803 sets association information for associating the temporary storage unit allocated at STEP S2504 and the read out refining condition and sorting condition in the access condition associating unit 205 (at STEP S2505). The temporary storage writing unit 1803 then reads out a predetermined number of pieces of content information from the content information database unit 202 on the basis of the read out refining condition and sorting condition (at STEP S2506). The temporary storage writing unit 1803 then writes the read out content information in the temporary storage unit allocated at STEP S2504 (at STEP S2507). The process then returns to STEP S2502.

If it is determined that the sorting conditions to be read out no longer exist at STEP S2503, the temporary storage writing unit 1803 detects existence or absence of a content information temporary storage writing request (hereinafter, referred to as a writing request) sent from a reading and displaying process thread (FIG. 13) (at STEP S2508). If the writing request is not detected, the temporary storage writing unit 1803 determines whether or not the refining condition is changed in the reading and displaying process (at STEP S2509). If the change of the refining condition is not detected at STEP S2509, the temporary storage writing unit 1803 detects existence or absence of a termination command sent from the booting process shown in FIG. 7 (at STEP S2510). If the termination command is not detected, the process returns to STEP S2508.

If the writing request is detected at STEP S2508, the temporary storage writing unit 1803 reads out a refining condition and a sorting condition that are associated with the temporary storage unit targeted by the writing request from the access condition associating unit 205 (at STEP S2521). The temporary storage writing unit 1803 then reads out a predetermined number of pieces of next content information from the content information database unit 202 according to the read out retrieval condition and sorting condition (STEP S2522). The temporary storage writing unit 1803 writes the read out content information in the target temporary storage unit (at STEP S2523). The process then proceeds to STEP S2509.

If the change of the refining condition is detected at STEP S2509, the process returns to STEP S2501. The above-described processing steps are executed using the changed refining condition. More specifically, the access condition deciding unit 1808 decides a set of sorting conditions corresponding to the changed refining condition with reference to the access condition deciding information 2700a and 2700b shown in FIGS. 27A and 27B. The processing of STEPS S2501 to S2507 is executed using the newly selected set of sorting conditions and the changed refining condition. In such a manner, association information is decided according to the newly selected set of sorting conditions and the refining condition and contents of the temporary storage units are updated.

If the termination command is detected at STEP S2510, the temporary storage writing unit 1803 frees all of the temporary storage units allocated at STEP S2504 (at STEP S2531) and terminates this process.

The refining condition, which is a logical multiplication of a predetermined retrieval condition (not shown) and a refining condition selected through the buttons 1001-1 to 1001-5 shown in FIG. 26, specifies content information in the content information database unit 202. In this exemplary embodiment, a logical multiplication of the refining condition and the retrieval condition is employed as an extraction condition. However, a retrieval condition does not have to be employed. In addition, if a change of a refining condition is detected at STEP S2509, a set of sorting conditions is updated and contents of temporary storage units are updated. Accordingly, STEP S1321b shown in FIG. 13 is omitted here.

FIG. 26 shows an example of user interface screen 500 according to the exemplary embodiment 4. As shown in FIG. 26, the user interface screen 500 includes a content information display area 510, a sorting condition selection button display area 2620, a refining condition selection button display area 1010, a next content display button 530, and an end button 540.

The sorting condition selection button display area 2620 includes sorting condition selection buttons 2602-1 to 2602-6. An operation performed in response to selection of one of the sorting condition selection buttons 2602-1 to 2602-6 is the same as that performed in response to selection of the sorting condition selection buttons 502-1 to 502-6 described with reference to FIG. 5. In the exemplary embodiment 4, the selectable sorting condition selection buttons 2602-1 to 2602-6 are switched according to the selected refining condition selection buttons 1001-1 to 1001-5. Although not shown, this switching may be performed based on the determination of the content information displaying unit 207 or by the content information displaying unit 207 inquiring the access condition deciding unit 1808 about available sorting conditions.

FIGS. 27A and 27B show examples of access condition deciding information according to the exemplary embodiment 4. As shown in FIGS. 27A and 27B, the access condition deciding information 2700a and 2700b includes a refining condition and a sorting condition. For example, when a refining condition is set to "PHOTOGRAPH", a set of sorting conditions "NAME (ASCENDING ORDER)", "CREATION DATE/TIME (ASCENDING ORDER)", "CREATOR (ASCENDING ORDER)", "CAMERA TYPE (ASCENDING ORDER)", "CAPTURING MODE (ASCENDING ORDER)", and "RESOLUTION (ASCENDING ORDER)" is selected. The access condition deciding information 2700a and 2700b is only an example and the access condition deciding information is not limited to this particular example. In response to selection of a button of a refining condition, the content information displaying unit 207 decides selectable sorting conditions with reference to the access condition deciding information 2700a and 2700b and displays the sorting condition selection buttons at the sorting condition selection button display area 2620.

As described above, according to this exemplary embodiment, the speed of reading and displaying contents can be improved even when a set of selectable sorting conditions changes in response to selection of a refining condition. A single data access apparatus may execute the content information displaying processes according to the above-described exemplary embodiments 1 to 4. In such a case, a user can select a combination of database access conditions, such as "a refining condition+a sorting condition" or "a grouping condition+a sorting condition". When the user selects the combination of the refining condition and the sorting condition, the displaying process described in the exemplary embodiment 2 may be executed.

While exemplary embodiments of the present invention have been described in detail above, the present invention can be realized as, for example, a system, an apparatus, a method, a program, or a storage medium. More specifically, the exemplary embodiments of the present invention may be applied to a system constituted by a plurality of devices or to an apparatus constituted by a single device.

In addition, in the present invention, software programs realizing functions of the above-described exemplary embodiments may be supplied to a system or an apparatus directly or remotely. The functions can be achieved by a computer included in the system or the apparatus reading out and executing the supplied program codes. In this case, the programs to be supplied correspond to the flowcharts shown in the drawings in the exemplary embodiments.

Thus, the program codes installed in the computer to allow the computer to realize the functions of the exemplary embodiments of the present invention also embody the present invention. The computer program for realizing the functions of the exemplary embodiments of the present invention is also included in the scope of the present invention.

In such a case, the program may be in any form, such as, an object code, a program executed by an interpreter, or script data supplied to an operating system, as long as it has functions of the program.

Types of recording media used for supplying the program include, for example, a Floppy Disc®, a hard disk, an optical disc such as a CD-ROM, a CD-R, a CD-RW, and a DVD (DVD-ROM or DVD-R), a magneto-optical disc such as an MO, a magnetic tape, a nonvolatile memory card, and a ROM.

Regarding methods for supplying the program, the program may be supplied to a client computer by accessing a Web site using a browser of the client computer and downloading the program from the Web site to a recording medium, such as a hard disk. In this case, the program to be downloaded may be a compressed file having an automatic installation function. In addition, program codes constituting the program according to an aspect of the present invention may be divided into a plurality of files and each of the plurality of files may be downloaded from different web sites, whereby functions of the present invention can be realized. A World Wide Web server that allows a plurality of users to download the program files for allowing a computer to realize the functions of the exemplary embodiments of the present invention is also included in the scope of the present invention.

Additionally, the program according to an aspect of the present invention may be encrypted and stored on a storage medium, such as a CD-ROM, and distributed to users. Only users that satisfy a predetermined condition are allowed to download information of a decryption key from a Web site via the Internet. The encrypted program is executed using the key information and installed in a computer, whereby functions of the present invention can be realized.

Furthermore, the computer may execute the read out program, thereby realizing functions of the above-described exemplary embodiments. In addition, an operating system or the like operating on the computer may perform some or all of the actual processing operations on the basis of instructions of the program and the functions of the above-described exemplary embodiments may be realized by the processing operations.

Moreover, the program read out from the recording medium may be written in a memory included in a function expansion board inserted into the computer or a memory included in a function expansion unit connected to the computer, thereby realizing all of or some of the functions of the above-described exemplary embodiments. In this case, on the basis of instructions of the program, a CPU or the like included in the function expansion board or the function expansion unit executes some or all of the processing operations after the program is written in the function expansion board or the function expansion unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Application No. 2007-031279 filed Feb. 9, 2007, which is hereby incorporated by reference herein in its entirety.

What is claimed is:

1. An information processing apparatus comprising:
a first holding unit configured to hold contents;
a selecting unit configured to make a user select a display condition, for displaying a part of the contents held by the first holding unit, from a plurality of different display conditions preliminarily set for displaying the contents on a display;
a readout unit configured to read out parts of the contents held by the first holding unit, which differ according to each of the plurality of the display conditions preliminarily set, for each of the plurality of the display conditions before the display condition is selected by the user;
a second holding unit configured to store the parts of the contents, which differ according to each of the plurality of the display conditions, read out by the readout unit in memory areas before the selection of the display condition by the user, each of the memory areas being specified based on a corresponding one of the different display conditions; and
a display control unit configured to read out, in a case where the user selects one of the plurality of different display conditions, the part of the contents stored in a corresponding one of the memory areas by the second holding unit and display that part of the contents,
wherein each of the plurality of display conditions is a combination of any of a plurality of sorting conditions and any of a plurality of refining conditions, wherein the second holding unit reads out a predetermined number of pieces of the contents from a storage unit, for each of the plurality of display conditions, according to the sorting conditions, and stores the predetermined number of pieces of the contents in corresponding memory areas, and wherein each of the plurality of different display conditions includes a sorting condition and a grouping condition used for grouping the contents having identical data regarding a specified information item into an identical group, and wherein the readout unit groups the contents according to the grouping conditions, and reads out, for each group, the contents that come first when the contents are sorted according to the sorting condition from the first holding unit, and stores the read out contents in the corresponding ones of the plurality of memory areas.

2. An information processing apparatus comprising:

a first holding unit configured to hold contents;

a selecting unit configured to make a user select a display condition, for displaying a part of the contents held by the first holding unit, from a plurality of different display conditions preliminarily set for displaying the contents on a display;

a readout unit configured to read out parts of the contents held by the first holding unit, which differ according to each of the plurality of the display conditions preliminarily set, for each of the plurality of the display conditions before the display condition is selected by the user;

a second holding unit configured to store the parts of the contents, which differ according to each of the plurality of the display conditions, read out by the readout unit in memory areas before the selection of the display condition by the user, each of the memory areas being specified based on a corresponding one of the different display conditions; and a display control unit configured to read out, in a case where the user selects one of the plurality of different display conditions, the part of the contents stored in a corresponding one of the memory areas by the second holding unit and display that part of the contents, wherein each of the plurality of display conditions is a combination of any of a plurality of sorting conditions and any of a plurality of refining conditions, wherein the second holding unit reads out a predetermined number of pieces of the contents from a storage unit, for each of the plurality of display conditions, according to the sorting conditions, and stores the predetermined number of pieces of the contents in corresponding memory areas, and wherein each of the plurality of different display conditions includes a refining condition used for refining the contents by an item of the contents, and each of the plurality of different display conditions includes combinations of a selected refining condition and all selectable sorting conditions corresponding to the selected refining condition, the apparatus further comprising:

a registering unit configured to hold the sorting conditions selectable by a user in association with the refining conditions selectable by the user.

3. An information processing apparatus comprising:

a first holding unit configured to hold contents;

a selecting unit configured to make a user select a display condition, for displaying a part of the contents held by the first holding unit, from a plurality of different display conditions preliminarily set for displaying the contents on a display;

a readout unit configured to read out parts of the contents held by the first holding unit, which differ according to each of the plurality of the display conditions preliminarily set, for each of the plurality of the display conditions before the display condition is selected by the user;

a second holding unit configured to store the parts of the contents, which differ according to each of the plurality of the display conditions, read out by the readout unit in memory areas before the selection of the display condition by the user, each of the memory areas being specified based on a corresponding one of the different display conditions;

a display control unit configured to read out, in a case where the user selects one of the plurality of different display conditions, the part of the contents stored in a corresponding one of the memory areas by the second holding unit and display that part of the contents; and an update unit configured to update the plurality of display conditions, wherein each of the plurality of display conditions is a combination of any of a plurality of sorting conditions and any of a plurality of refining conditions, and wherein the update unit updates any of the combinations, wherein each of the plurality of different display conditions includes a sorting condition and a grouping condition used for grouping the contents having identical data regarding a specified information item into an identical group, and wherein the readout unit groups the contents according to the grouping conditions, and reads out, for each group, the contents that come first when the contents are sorted according to the sorting condition from the first holding unit, and stores the read out contents in the corresponding ones of the plurality of memory areas.

4. An information processing apparatus comprising:

a first holding unit configured to hold contents;

a selecting unit configured to make a user select a display condition, for displaying a part of the contents held by the first holding unit, from a plurality of different display conditions preliminarily set for displaying the contents on a display;

a readout unit configured to read out parts of the contents held by the first holding unit, which differ according to each of the plurality of the display conditions preliminarily set, for each of the plurality of the display conditions before the display condition is selected by the user;

a second holding unit configured to store the parts of the contents, which differ according to each of the plurality of the display conditions, read out by the readout unit in memory areas before the selection of the display condition by the user, each of the memory areas being specified based on a corresponding one of the different display conditions;

a display control unit configured to read out, in a case where the user selects one of the plurality of different display conditions, the part of the contents stored in a corresponding one of the memory areas by the second holding unit and display that part of the contents; and an update unit configured to update the plurality of display conditions, wherein each of the plurality of display conditions is a combination of any of a plurality of sorting conditions and any of a plurality of refining conditions, and wherein the update unit updates any of the combinations, wherein each of the plurality of different display conditions includes a refining condition used for refining the contents by an item of the contents, and each of the plurality of different display conditions includes combinations of a selected refining condition and all selectable sorting conditions corresponding to the selected refining condition, the apparatus further comprising:

a registering unit configured to hold the sorting conditions selectable by a user in association with the refining conditions selectable by the user.

5. An information processing apparatus for reading out content information from a storage unit that stores content information and displaying the content information, the information processing apparatus comprising:

a generation unit configured to combine refining conditions used for extracting contents from the storage unit with each of a plurality of sorting conditions used for specifying order of reading out the contents and generate a plurality of display conditions;

a first holding unit configured to hold association information for associating each of the plurality of display conditions with each of a plurality of memory areas;

a second holding unit configured to read out a plurality of pieces of content information from the storage unit according to each of the plurality of display conditions and hold each of the plurality of pieces of the content information read out according to each of the plurality of display conditions in a corresponding memory area of the plurality of memory areas;

a display control unit configured to specify a memory area corresponding to a display condition specified by a user based on the association information, read out content information from the specified memory area, and perform display based on the read out content information on a display; and an update unit configured, in a case where the refining condition is changed, to cause the generation unit, the first holding unit and the second holding unit to function based on the changed refining condition and update the content information held in the plurality of memory areas.

6. An image processing method used by an information processing apparatus for reading out content information from a storage unit that stores content information and displaying the content information, the information processing method comprising:

a generation step in which a generation unit combines refining conditions used for extracting contents from the storage unit with each of a plurality of sorting conditions used for specifying order of reading out the contents and generate a plurality of display conditions;

a first holding step in which a first holding unit holds association information for associating each of the plurality of display conditions with each of a plurality of memory areas;

a second holding step in which a second holding unit reads out a plurality of pieces of content information from the storage unit according to each of the plurality of display conditions and holds each of the plurality of pieces of the content information read out according to each of the plurality of display conditions in a corresponding memory area of the plurality of memory areas;

a display control step in which a display control unit specifies a memory area corresponding to a display condition specified by a user based on the association information, reads out content information from the specified memory area, and performs display based on the read out content information on a display; and an update step in which an update unit, in a case where the refining condition is changed, causes the generation unit, the first holding unit and the second holding unit to function based on the changed refining condition and updates the content information held in the plurality of memory areas.

* * * * *